US007280904B2

(12) United States Patent
Kaji

(10) Patent No.: US 7,280,904 B2
(45) Date of Patent: Oct. 9, 2007

(54) MARINE VESSEL RUNNING CONTROLLING APPARATUS, AND MARINE VESSEL INCLUDING THE SAME

(75) Inventor: Hirotaka Kaji, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/612,597

(22) Filed: Dec. 19, 2006

(65) Prior Publication Data

US 2007/0155258 A1 Jul. 5, 2007

(30) Foreign Application Priority Data

Dec. 20, 2005 (JP) ............................ 2005-365854

(51) Int. Cl.
*B63H 35/00* (2006.01)
*G06F 19/00* (2006.01)

(52) U.S. Cl. ........................................ 701/101; 701/21

(58) Field of Classification Search ................ 701/101, 701/102, 21, 116; 440/53, 84; 123/399, 123/361
See application file for complete search history.

(56) References Cited

U.S. PATENT DOCUMENTS

| | | | | |
|---|---|---|---|---|
| 6,298,824 | B1 * | 10/2001 | Suhre | 123/406.49 |
| 6,431,930 | B1 | 8/2002 | Holt | |
| 6,549,815 | B1 | 4/2003 | Kaji | |
| 6,549,830 | B2 | 4/2003 | Harada et al. | |
| 6,738,708 | B2 | 5/2004 | Suzuki et al. | |
| 6,848,382 | B1 * | 2/2005 | Bekker | 114/144 B |
| 6,855,020 | B2 | 2/2005 | Kaji | |
| 6,884,128 | B2 | 4/2005 | Okuyama et al. | |
| 6,994,046 | B2 * | 2/2006 | Kaji et al. | 440/53 |
| 7,021,283 | B2 | 4/2006 | Okuyama | |

FOREIGN PATENT DOCUMENTS

| | | | |
|---|---|---|---|
| JP | 10-131780 | A | 5/1998 |
| JP | 2000-108995 | A | 4/2000 |
| JP | 2001-205015 | A | 7/2000 |
| JP | 2000-250602 | A | 9/2000 |
| JP | 2001-152898 | A | 6/2001 |
| JP | 2001-260986 | A | 9/2001 |
| JP | 2002-213290 | A | 7/2002 |
| JP | 2006-009725 | A | 1/2006 |
| WO | 02/36954 | A1 | 5/2002 |

* cited by examiner

*Primary Examiner*—Hieu T. Vo
(74) *Attorney, Agent, or Firm*—Keating & Bennett, LLP

(57) ABSTRACT

A marine vessel running controlling apparatus is applicable to a marine vessel which includes a propulsive force generating unit having an engine with an electric throttle as a drive source for generating a propulsive force to propel a hull of the marine vessel. The apparatus includes an operational unit to be operated by an operator of the marine vessel so as to control the propulsive force, and a control unit which updates control information related to an opening degree of the electric throttle with respect to an operation amount of the operational unit based on a marine vessel traveling result.

13 Claims, 27 Drawing Sheets

① LOWER SPEED CHARACTERISTIC OPERATING REGION
② INFLECTION POINT OPERATING REGION
③ HIGHER SPEED CHARACTERISTIC OPERATING REGION

MARINE VESSEL RUNNING CONTROLLING APPARATUS, AND MARINE VESSEL INCLUDING THE SAME

BACKGROUND OF THE INVENTION

1. Field of the Invention

The present invention relates to a marine vessel which includes a propulsive force generating unit having an engine with an electric throttle as a drive source, and a marine vessel running controlling apparatus for such a marine vessel.

2. Description of the Related Art

An exemplary propulsion system provided in a marine vessel such as a cruiser or a boat for a leisure purpose is an outboard motor attached to a stern (transom) of the marine vessel. The outboard motor includes a propulsion unit provided outboard and including an engine as a drive source and a propeller as a propulsive force generating member, and a steering mechanism which horizontally turns the entire propulsion unit with respect to a hull of the marine vessel.

A control console for controlling the marine vessel is provided on the hull. The control console includes, for example, a steering operational section for performing a steering operation, and a throttle operational section for controlling the output of the outboard motor. The throttle operational section includes, for example, a throttle lever (remote control lever) to be operated forward and reverse by an operator of the marine vessel. The throttle lever is mechanically connected to a throttle of the engine of the outboard motor via a wire. Therefore, the output of the engine is controlled by operating the throttle lever. A relationship between the operation amount (operation position) of the throttle lever and the throttle opening degree is constant.

In a typical engine, a relationship between an engine speed and the throttle opening degree is nonlinear. In a lower throttle opening degree range of the typical engine, as shown in FIG. 29, the engine speed steeply increases with an increase in the throttle opening degree. In a higher throttle opening degree range of the engine, the engine speed moderately increases with the increase in the throttle opening degree. This tendency is particularly remarkable in the case of a throttle including a butterfly valve. A throttle employing ISC (idle speed control) also exhibits this tendency to some degree.

Particularly, such a nonlinear characteristic significantly influences the control of a small-scale marine vessel including an outboard motor having no speed change gear. More specifically, as shown in FIG. 30, a resistance received by the marine vessel from a water surface is relatively small in a lower speed range, and varies in a complicated manner due to a frictional resistance and a wave-making resistance. In addition, the engine speed is steeply changed in response to a slight throttle operation, so that a propulsive force generated by the outboard motor is liable to be changed. When fine control of the propulsive force is required, for example, when the marine vessel is moved toward or away from a docking site or moved to different fishing points, a higher level of marine vessel maneuvering skill is required. Therefore, an unskilled operator of a leisure boat or the like cannot easily control the throttle lever when moving the boat toward or away from a docking site.

On the other hand, the engine is required to have higher responsiveness in a middle-to-high speed range which is higher than a hump range (corresponding to an engine speed of about 2000 rpm at which a maximum wave-making resistance is observed). This is because the marine vessel is preferably quickly brought into a smooth traveling state (planing state) out of the hump range and has higher responsiveness for traveling over surges. Therefore, the engine speed is required to be quickly changed in response to the operation of the throttle lever in the middle-to-high engine speed range. However, the throttle opening degree-engine speed characteristic shown in FIG. 29 does not meet this requirement.

In the automotive field, electric throttles have recently been used, which are driven by an actuator according an accelerator operation amount detected by a potentiometer. It is conceivable to use such an electric throttle for the engine output control of the propulsion system such as the outboard motor. In this case, the throttle lever operation amount-throttle opening degree characteristic, which is defined as a fixed linear relationship in the prior art arrangement having the throttle lever and the throttle mechanically connected to each other, can be flexibly modified. For example, the operation amount-throttle opening degree characteristic can be nonlinear. Therefore, the marine vessel maneuvering characteristic for lower speed traveling (with a lower throttle opening degree) can be improved by properly setting the operation amount-throttle opening degree characteristic.

SUMMARY OF THE INVENTION

In order to overcome the problems described above, a preferred embodiment of the present invention provides a marine vessel running controlling apparatus for a marine vessel which includes a propulsive force generating unit having an engine with an electric throttle as a drive source for generating a propulsive force to propel a hull of the marine vessel. The marine vessel running controlling apparatus includes an operational unit to be operated by an operator of the marine vessel for controlling the propulsive force, and a control unit arranged to update control information related to an opening degree of the electric throttle with respect to an operation amount of the operational unit based on data obtained during travel of the marine vessel.

More specifically, the control unit includes, for example, an engine characteristic measuring unit arranged to measure an output characteristic of the engine, a throttle opening degree characteristic setting unit arranged to determine an operation amount-target throttle opening degree characteristic defining a relationship between the operation amount of the operational unit and a target throttle opening degree of the electric throttle based on the engine output characteristic measured by the engine characteristic measuring unit, and a target throttle opening degree setting unit arranged to determine the target throttle opening degree for the operation amount of the operational unit according to the operation amount-target throttle opening degree characteristic determined by the throttle opening degree characteristic setting unit.

With this unique arrangement, the operation amount-target throttle opening degree characteristic is determined based on the engine output characteristic actually measured. The target throttle opening degree for the operation amount of the operational unit is determined according to the operation amount-target throttle opening degree characteristic by the target throttle opening degree setting unit. The electric throttle is driven according to the target throttle opening degree thus determined, thereby providing a desired operation amount-engine output characteristic. In short, the target throttle opening degree corresponding to the operation amount of the operational unit is determined based on data obtained during actual travel of the marine vessel with the propulsive force generating unit mounted thereon.

The engine characteristic measuring unit may include an engine speed measuring unit arranged to measure an engine speed. Thus, the engine output characteristic can be directly measured.

The engine output characteristic may be measured indirectly. The indirect measurement of the engine output characteristic may be achieved, for example, by measuring the traveling speed of the marine vessel via a speed measuring unit during travel of the marine vessel and determining the acceleration of the marine vessel based on the traveling speed.

The marine vessel running controlling apparatus preferably further includes a target characteristic setting unit arranged to determine a target characteristic for an operation amount-engine output characteristic which defines a relationship between the operation amount of the operational unit and an engine output. In this case, the throttle opening degree characteristic setting unit is preferably arranged to determine the operation amount-target throttle opening degree characteristic so as to provide the target characteristic determined by the target characteristic setting unit.

With this unique arrangement, the target characteristic for the operation amount-engine output characteristic is determined by the target characteristic setting unit, and the operation amount-target throttle opening degree characteristic is determined based on the actual engine output characteristic to provide the target characteristic. Therefore, the relationship between the operation amount of the operational unit and the engine output can be adapted for an operator's preference by properly setting the target characteristic. As a result, the maneuverability of the marine vessel is significantly improved, so that the operator can easily perform a throttle operation for moving the marine vessel toward or away from a docking site or for trolling.

More specifically, even if a throttle opening degree-engine output characteristic is nonlinear, the engine output can be changed linearly with respect to the operation amount of the operational unit by setting the target characteristic such that the relationship between the operation amount of the operational unit and the engine output is linear. Thus, the operator can easily and intuitively understand the relationship between the operation amount of the operational unit and the engine output. Therefore, even an unskilled operator can easily control the marine vessel (throttle operation).

Further, the operation amount-engine output characteristic may be preliminarily determined such that the engine output is changed with respect to the operation amount of the operational unit by a smaller amount in a lower speed range in which the engine output is relatively low and the engine output is changed with respect to the operation amount of the operational unit by a greater amount in a higher speed range in which the engine output is relatively high. Thus, a marine vessel maneuvering operation which requires fine control of the throttle operation in a lower engine output state can be easily performed for moving the marine vessel toward or away from a docking site or for trolling. In a higher engine output state, the engine output can be changed with higher responsiveness to the operation of the operational unit.

The target characteristic for the operation amount-engine output characteristic may be a predetermined constant characteristic (e.g., a linear characteristic). However, it is preferred to additionally provide a target characteristic inputting unit which receives an input for setting the target characteristic for the operation amount-engine output characteristic, and to cause the target characteristic setting unit to determine the target characteristic based on the input from the target characteristic inputting unit.

With this unique arrangement, the target characteristic can be set as desired according to the input from the target characteristic inputting unit. Therefore, the target characteristic can be variably set according to personal preference. Thus, the marine vessel maneuvering characteristic is set closer to the operator's preference, so that even a less skilled operator can easily control the marine vessel.

The marine vessel running controlling apparatus may further include a target characteristic storage unit which is capable of storing a plurality of target characteristics for the operation amount-engine output characteristic. In this case, the target characteristic inputting unit preferably includes a selecting unit arranged to select one of the target characteristics stored in the target characteristic storage unit. Thus, the target characteristic can be easily set.

Further, in this case, the throttle opening degree characteristic setting unit preferably includes a throttle opening degree characteristic storage unit which is capable of storing a plurality of operation amount-target throttle opening degree characteristics for the respective target characteristics stored in the target characteristic storage unit, and is arranged to read out one of the operation amount-target throttle opening degree characteristics corresponding to the target characteristic selected by the selecting unit from the throttle opening degree characteristic storage unit. This eliminates the need for calculation of the operation amount-target throttle opening degree characteristic, thereby alleviating a computational load on a computer.

The engine characteristic measuring unit may include a unit which is arranged to measure a throttle opening degree-engine output characteristic which defines a relationship between the opening degree of the electric throttle and the engine output. In this case, the throttle opening degree characteristic setting unit may be arranged to determine the operation amount-target throttle opening degree characteristic based on the throttle opening degree-engine output characteristic measured by the engine characteristic measuring unit.

With this unique arrangement, the throttle opening degree-engine output characteristic defining the relationship between the electric throttle opening degree and the engine output is measured, and then the operation amount-target throttle opening degree characteristic is determined based on the result of the measurement. Thus, the operation amount-target throttle opening degree characteristic can be more reliably determined as desired, because the determination of the operation amount-target throttle opening degree is based on the result of the actual measurement of the throttle opening degree-engine output characteristic.

The engine characteristic measuring unit may include a unit which is arranged to divide a predetermined throttle opening degree range (a full range or a part of the range) into a plurality of zones, and classify a plurality of measurement values into the plurality of zones according to the throttle opening degree. In this case, representative values (e.g., averages) are calculated for the respective zones from the measurement values, and the throttle opening degree-engine output characteristic may be determined by linear interpolation based on the representative values.

In this case, the engine characteristic measuring unit is preferably arranged to repeatedly measure the throttle opening degree and the engine output until the calculation of the representative values is permitted for all the zones (e.g., until at least one measurement value is obtained for each of the zones).

However, the representative values are not necessarily required to be calculated for all the zones, but the measurement of the throttle opening degree and the engine output may be repeated until the calculation of the representative values is permitted for some of the zones. More specifically, the measurement of the throttle opening degree and the engine output may be repeated until the calculation of the representative values is permitted for a zone corresponding to a throttle fully closed state and a zone corresponding to a throttle fully open state (e.g., at least one measurement value is obtained for each of these zones). Thus, a marine vessel maneuvering characteristic close to the desired characteristic is quickly provided. Then, the operation amount-target throttle opening degree characteristic is modified based on the throttle opening degree and the engine output measure thereafter, whereby the marine vessel maneuvering characteristic can be gradually converged on the desired characteristic with high accuracy. Particularly, where the engine characteristic is measured during travel of the marine vessel, whether measurement values for all the zones can be measured or not depends on how the marine vessel is maneuvered. Therefore, the aforementioned arrangement makes it possible to easily provide the operation amount-target throttle opening degree characteristic close to the desired characteristic.

The engine characteristic measuring unit may include a unit which is arranged to measure the operation amount-engine output characteristic defining the relationship between the operation amount of the operational unit and the engine output. In this case, the throttle opening degree characteristic setting unit is preferably arranged to determine the operation amount-target throttle opening degree characteristic based on the operation amount-engine output characteristic measured by the engine characteristic measuring unit.

With this unique arrangement, the operation amount-engine output characteristic defining the relationship between the operation amount of the operational unit and the engine output is measured, and then the operation amount-target throttle opening degree characteristic is determined based on the result of the measurement. Thus, the operation amount-target throttle opening degree characteristic can be more reliably determined as desired based on the actually measured operation amount-engine output characteristic.

The engine characteristic measuring unit may include a unit which is arranged to divide a predetermined operation amount range (a full range or apart of the range) into a plurality of zones, and classify a plurality of measurement values into the plurality of zones according to the operation amount. In this case, representative values (e.g., averages) are calculated for the respective zones from the measurement values, and the operation amount-engine output characteristic maybe determined by linear interpolation based on the representative values.

In this case, the engine characteristic measuring unit is preferably arranged to repeatedly measure the operation amount and the engine output until the calculation of the representative values is permitted for all the zones (e.g., until at least one measurement value is obtained for each of the zones).

However, the representative values are not necessarily required to be calculated for all the zones, but the measurement of the operation amount and the engine output may be repeated until the calculation of the representative values is permitted for some of the zones. More specifically, the measurement of the operation amount and the engine output may be repeated until the calculation of the representative values is permitted for a zone of an operation amount corresponding to the throttle fully closed state and a zone of an operation amount corresponding to the throttle fully open state (e.g., at least one measurement value is obtained for each of these zones). Thus, a marine vessel maneuvering characteristic close to the desired characteristic is quickly provided. Then, the operation amount-target throttle opening degree characteristic is modified based on the operation amount and the engine output thereafter measured, whereby the marine vessel maneuvering characteristic can be gradually converged on the desired characteristic with high accuracy. Particularly, where the engine characteristic is measured during travel of the marine vessel, whether measurement values for all the zones can be measured or not depends on how the marine vessel is maneuvered. Therefore, the aforementioned arrangement makes it possible to easily provide the operation amount-target throttle opening degree characteristic close to the desired characteristic.

The marine vessel running controlling apparatus may further include an engine characteristic storage unit which is capable of storing the engine output characteristic measured by the engine characteristic measuring unit, a difference computing unit arranged to compute a difference between an engine output characteristic newly measured by the engine characteristic measuring unit and the engine output characteristic previously stored in the engine characteristic storage unit, and an informing unit arranged to give information to the operator when the difference calculated by the difference computing unit is not smaller than a predetermined threshold.

In this case, the marine vessel running controlling apparatus preferably further includes a characteristic update commanding unit which is operated by the operator for selecting one of the newly measured engine output characteristic and the previously stored engine output characteristic to be used for computation by the throttle opening degree characteristic setting unit, and an updating unit arranged to update the previous engine output characteristic to the new engine output characteristic which is used for the computation by the throttle opening degree characteristic setting unit when the new engine output characteristic is selected via the characteristic update commanding unit.

With this unique arrangement, where an engine driving state is changed due to a temporary change in the number of passengers or the weight of cargo, for example, an unintended change in the operation amount-target throttle opening degree characteristic is prevented.

The engine output characteristic may be measured, for example, by a towing tank test. More specifically, a propulsive force generating member (e.g., a propeller) for the towing tank test is attached to the propulsive force generating unit before the propulsive force generating unit is attached to the hull, and then the propulsive force generating unit is immersed in a towing tank. In this state, the engine is driven for measuring the engine output characteristic. The operation amount-target throttle opening degree characteristic may be determined based on the measured engine output characteristic so as to provide the desired operation amount-engine output characteristic.

However, a test propeller, which is different in characteristics from a propeller to be used for the actual marine vessel, is used for the towing tank test. In the towing tank test, the characteristics are measured with the propulsive force generating unit being detached from the hull. Therefore, a resistance characteristic inherent to the hull of the marine vessel cannot be reflected to the output characteristic of the engine. In addition, a combination of the propeller and the hull of the marine vessel is selected by a boat builder or a user, thereby making it difficult to preliminarily determine an optimum operation amount-target throttle opening degree characteristic. Therefore, the desired operation amount-engine output characteristic is more reliably provided by measuring the characteristic in an actual marine vessel running state and tuning the operation amount-target throttle opening degree characteristic based on the result of the measurement rather than measuring the characteristic by the towing tank test.

The marine vessel running controlling apparatus preferably further includes a traveling judging unit arranged to judge whether the marine vessel is in a traveling state. In this case, the engine characteristic measuring unit is preferably arranged to measure the engine output characteristic if the traveling judging unit judges that the marine vessel is in the traveling state.

With this unique arrangement, the engine characteristic measuring unit measures the engine output characteristic during the travel of the marine vessel. Therefore, the characteristics of the propulsive force generating member actually attached to the propulsive force generating unit and the actual resistance characteristic of the marine vessel can be taken into consideration for the measurement of the engine output characteristic without the problems associated with the towing tank test. Thus, the desired operation amount-engine output characteristic can be more reliably provided by tuning the operation amount-target throttle opening degree characteristic based on the engine output characteristic thus measured.

The traveling judging unit may include a straight traveling judging unit arranged to judge whether the marine vessel is in a predetermined straight traveling state. In this case, the engine characteristic measuring unit is preferably arranged to measure the engine output characteristic if the straight traveling judging unit judges that the marine vessel is in the straight traveling state.

If the marine vessel is in a turning state, the resistance received by the marine vessel on water is dynamically changed. This makes it difficult to properly measure a steady-state engine output characteristic. In the preferred embodiments of the present invention, therefore, the engine output characteristic is measured on condition that the marine vessel is in the predetermined straight traveling state. Thus, the desired operation amount-engine output characteristic can be more reliably achieved.

The predetermined straight traveling state is herein defined as, for example, a state in which the steering angle of a steering mechanism provided in the marine vessel falls within a predetermined neutral range (e.g., a steering angle range defined between about −5 degrees and about +5 degrees with respect to a neutral position) when the propulsive force generating unit generates the propulsive force.

Another preferred embodiment of the present invention provides a marine vessel which includes a hull, a propulsive force generating unit attached to the hull and including an engine with an electric throttle as a drive source for generating a propulsive force, and the marine vessel running controlling apparatus described above. With this unique arrangement, the marine vessel has an improved maneuvering characteristic.

The marine vessel may be a relatively small-scale marine vessel such as a cruiser, a fishing boat, a water jet, or a watercraft, or other suitable vessel or vehicle.

The propulsive force generating unit maybe in the form of an outboard motor, an inboard/outboard motor (a stern drive), an inboard motor, or a water jet drive, or other suitable motor or drive. The outboard motor preferably includes a propulsion unit provided outboard and having a motor (engine) and a propulsive force generating member (propeller), and a steering mechanism which horizontally turns the entire propulsion unit with respect to the hull. The inboard/outboard motor preferably includes a motor provided inboard, and a drive unit provided outboard and having a propulsive force generating member and a steering mechanism. The inboard motor preferably includes a motor and a drive unit provided inboard, and a propeller shaft extending outboard from the drive unit. In this case, a steering mechanism is preferably separately provided. The water jet drive is preferably arranged such that water sucked from the bottom of the marine vessel is accelerated by a pump and ejected from an ejection nozzle provided at the stern of the marine vessel to provide a propulsive force. In this case, the steering mechanism preferably includes the ejection nozzle and a mechanism for turning the ejection nozzle in a horizontal plane.

Other elements, features, steps, characteristics and advantages of the present invention will become more apparent from the following detailed description of the preferred embodiments with reference to the attached drawings.

DETAILED DESCRIPTION OF PREFERRED EMBODIMENTS

Figure 1:
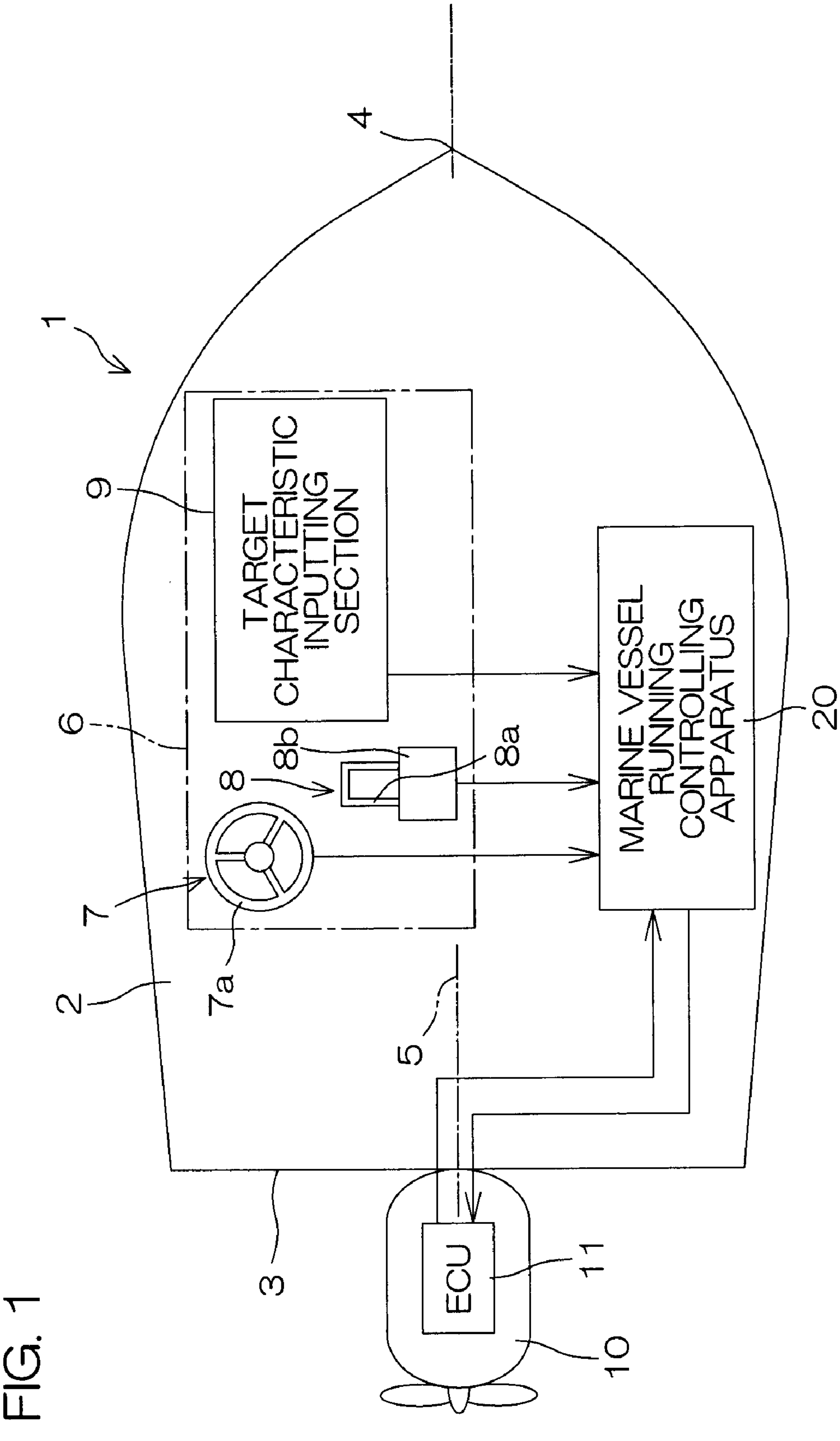
FIG. 1 is a schematic diagram for explaining the construction of a marine vessel according to one preferred embodiment of the present invention.

FIG. 1 is a schematic diagram for explaining the construction of a marine vessel 1 according to one preferred embodiment of the present invention. The marine vessel 1 is preferably a relatively small-scale marine vessel, such as a cruiser or a boat, and preferably includes an outboard motor 10 (propulsive force generating unit) attached to a stern (transom) 3 of a hull 2. The outboard motor 10 is positioned on a center line 5 of the hull 2 extending through the stern 3 and a bow 4 of the hull 2. An electronic control unit 11 (hereinafter referred to as "outboard motor ECU 11") is incorporated in the outboard motor 10.

A control console 6 for controlling the marine vessel 1 is provided on the hull 2. The control console 6 includes, for example, a steering operational section 7 for performing a steering operation, a throttle operational section 8 for controlling the output of the outboard motor 10, and a target characteristic inputting section 9 (a target characteristic inputting unit and a target characteristic change inputting unit). The steering operational section 7 includes a steering wheel 7*a* as a steering operational member. The throttle operational section 8 includes a remote control lever (throttle lever) 8*a* as a throttle operational member (operational unit), and a lever position detecting section 8*b* such as a potentiometer for detecting the operation position of the remote control lever 8*a*. The target characteristic inputting section 9 inputs a target characteristic for a remote control opening degree-engine speed characteristic which defines a relationship between the operation amount (remote control opening degree) of the remote control lever 8*a* and the engine speed of the outboard motor 10.

Input signals indicating the operation amounts of the operational sections 7, 8 provided on the control console 6 and an input signal from the target characteristic inputting section 9 are input as electric signals to a marine vessel running controlling apparatus 20, for example, via a LAN (local area network, hereinafter referred to as "inboard LAN") provided in the hull 2. The marine vessel running controlling apparatus 20 is an electronic control unit (ECU) including a microcomputer, and functions as a propulsive force controlling apparatus for propulsive force control and as a steering controlling apparatus for steering control.

The marine vessel running controlling apparatus 20 communicates with the outboard motor ECU 11 via the inboard LAN. More specifically, the marine vessel running controlling apparatus 20 acquires the engine speed (rpm) of the outboard motor 10, a steering angle indicating the orientation of the outboard motor 10, an engine throttle opening degree, and the shift position of the outboard motor 10 (forward drive, neutral, or reverse drive position) from the outboard motor ECU 11. The marine vessel running controlling apparatus 20 applies data including a target steering angle, a target throttle opening degree, a target shift position (forward drive, neutral, or reverse drive position) and a target trim angle to the outboard motor ECU 11.

The marine vessel running controlling apparatus 20 controls the steering angle of the outboard motor 10 according to the operation of the steering wheel 7*a*. The marine vessel running controlling apparatus 20 determines the target throttle opening degree and the target shift position for the outboard motor 10 according to the operation amount and direction of the remote control lever 8*a* (i.e., a lever position). The remote control lever 8*a* can be inclined forward and reverse. When an operator inclines the remote control lever 8*a* forward from a neutral position by a certain amount, the marine vessel running controlling apparatus 20 sets the target shift position of the outboard motor 10 at the forward drive position. When the operator inclines the remote control lever 8*a* further forward, the marine vessel running controlling apparatus 20 sets the target throttle opening degree of the outboard motor 10 according to the operation amount of the remote control lever 8*a*. On the other hand, when the operator inclines the remote control lever 8*a* reverse by a certain amount, the marine vessel running controlling apparatus 20 sets the target shift position of the outboard motor 10 at the reverse drive position. When the operator inclines the remote control lever 8*a* further reverse, the marine vessel running controlling apparatus 20 sets the target throttle opening degree of the outboard motor 10 according to the operation amount of the remote control lever 8*a*.

Figure 2:
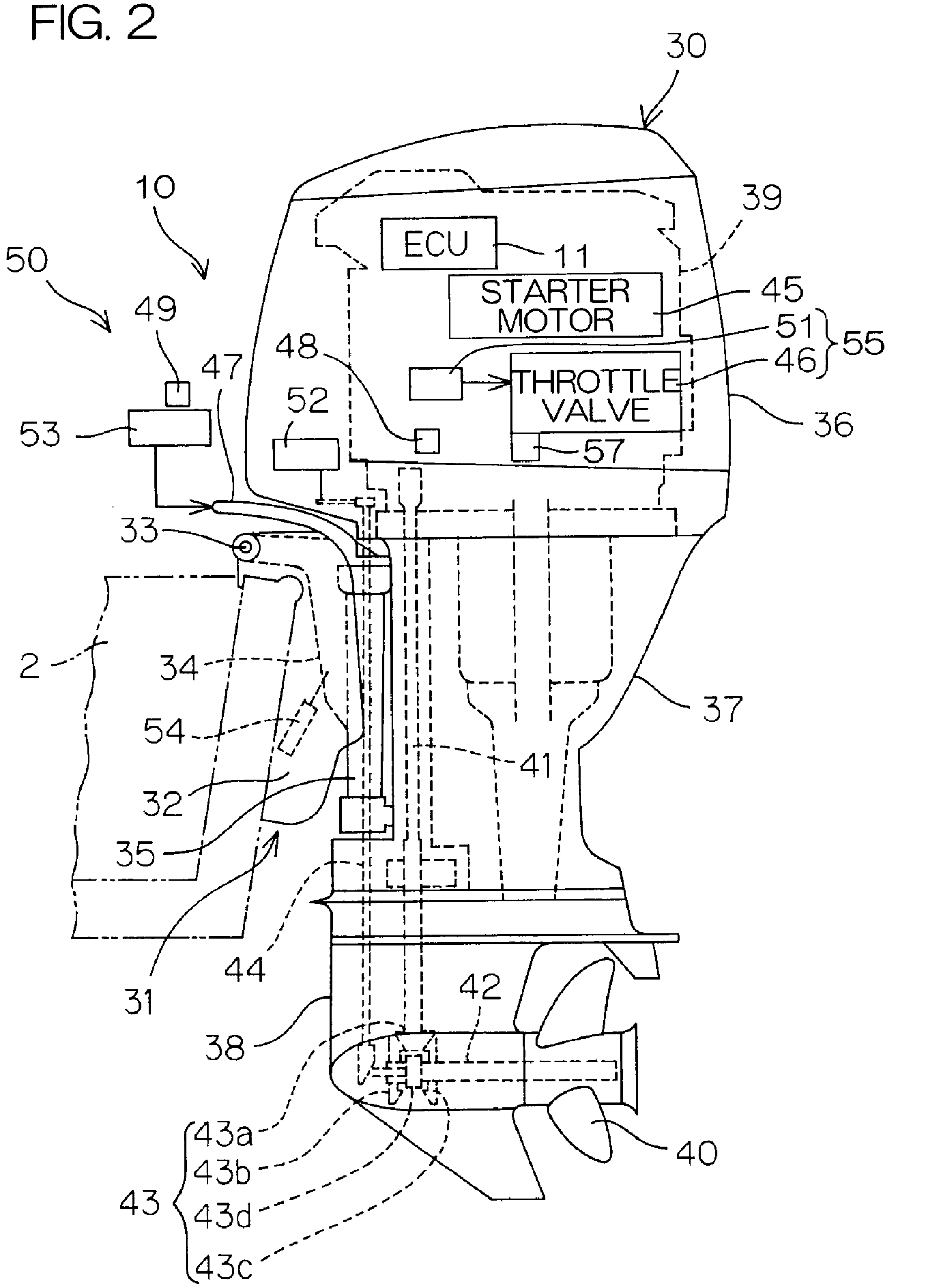
FIG. 2 is a schematic sectional view for explaining the construction of an outboard motor.

FIG. 2 is a schematic sectional view for explaining the construction of the outboard motor 10. The outboard motor 10 includes a propulsion unit 30 (propulsion system), and an attachment mechanism 31 for attaching the propulsion unit 30 to the hull 2. The attachment mechanism 31 includes a clamp bracket 32 detachably fixed to the transom of the hull 2, and a swivel bracket 34 connected to the clamp bracket 32 pivotally about a tilt shaft 33 (horizontal pivot axis). The propulsion unit 30 is attached to the swivel bracket 34 pivotally about a steering shaft 35. Thus, the steering angle (which is equivalent to an angle defined by the direction of the propulsive force with respect to the center line 5 of the hull 2) is changed by pivoting the propulsion unit 30 about the steering shaft 35. Further, the trim angle of the propulsion unit 30 (which is equivalent to an angle defined by the direction of the propulsive force with respect to a horizontal plane) is changed by pivoting the swivel bracket 34 about the tilt shaft 33.

The propulsion unit 30 has a housing which includes a top cowling 36, an upper case 37, and a lower case 38. An engine 39 is provided as a drive source in the top cowling 36 with an axis of a crank shaft thereof extending vertically. A drive shaft 41 for power transmission is coupled to a lower end of the crank shaft of the engine 39, and vertically extends through the upper case 37 into the lower case 38.

A propeller 40 (propulsive force generating member) is rotatably attached to a lower rear portion of the lower case 38. A propeller shaft 42 (rotation shaft) of the propeller 40 extends horizontally in the lower case 38. The rotation of the drive shaft 41 is transmitted to the propeller shaft 42 via a shift mechanism 43 (clutch mechanism).

The shift mechanism 43 includes a beveled drive gear 43*a* fixed to a lower end of the drive shaft 41, a beveled forward drive gear 43*b* rotatably provided on the propeller shaft 42, a beveled reverse drive gear 43*c* rotatably provided on the propeller shaft 42, and a dog clutch 43*d* provided between the forward drive gear 43*b* and the reverse drive gear 43*c*.

The forward drive gear 43*b* is meshed with the drive gear 43*a* from a forward side, and the reverse drive gear 43*c* is meshed with the drive gear 43*a* from a reverse side. Therefore, the forward drive gear 43*b* and the reverse drive gear 43*c* rotate in opposite directions when engaged with the drive gear 43*a*.

On the other hand, the dog clutch 43*d* is in spline engagement with the propeller shaft 42. That is, the dog clutch 43*d* is axially slidable with respect to the propeller shaft 42, but is not rotatable relative to the propeller shaft 42. Therefore, the dog clutch 43*d* is rotatable together with the propeller shaft 42.

The dog clutch 43*d* is slidable on the propeller shaft 42 by pivotal movement of a shift rod 44 that extends vertically parallel to the drive shaft 41 and is rotatable about its axis. Thus, the shift position of the dog clutch 43*d* is controlled to be set at a forward drive position at which it is engaged with the forward drive gear 43*b*, at a reverse drive position at which it is engaged with the reverse drive gear 43*c*, or at a neutral position at which it is not engaged with either the forward drive gear 43*b* or the reverse drive gear 43*c*.

When the dog clutch 43*d* is in the forward drive position, the rotation of the forward drive gear 43*b* is transmitted to the propeller shaft 42 via the dog clutch 43*d* with virtually no slippage between the dog clutch 43*d* and the propeller shaft 42. Thus, the propeller 40 is rotated in one direction (in a forward drive direction) to generate a propulsive force in a direction for moving the hull 2 forward. On the other hand, when the dog clutch 43*d* is in the reverse drive position, the rotation of the reverse drive gear 43*c* is transmitted to the propeller shaft 42 via the dog clutch 43*d* with virtually no slippage between the dog clutch 43*d* and the propeller shaft 42. The reverse drive gear 43*c* is rotated in a direction opposite to that of the forward drive gear 43*b*. Therefore, the propeller 40 is rotated in an opposite direction (in a reverse drive direction) to generate a propulsive force in a direction for moving the hull 2 in reverse. When the dog clutch 43*d* is in the neutral position, the rotation of the drive shaft 41 is not transmitted to the propeller shaft 42. That is, transmission of a driving force between the engine 39 and the propeller 40 is prevented, so that no propulsive force is generated in either of the forward and reverse directions.

Without provision of a speed change gear in the outboard motor 10, the propeller 40 is rotated according to the rotational speed of the engine 39 when the dog clutch 43*d* is in the forward drive position or the reverse drive position.

A starter motor 45 for starting the engine 39 is connected to the engine 39. The starter motor 45 is controlled by the outboard motor ECU 11. The propulsion unit 30 further includes a throttle actuator 51 for actuating a throttle valve 46 of the engine 39 in order to change the throttle opening degree to change the intake air amount of the engine 39. The throttle actuator 51 may be an electric motor. The throttle actuator 51 and the throttle valve 46 define an electric throttle 55.

The operation of the throttle actuator 51 is controlled by the outboard motor ECU 11. The opening degree of the throttle valve 46 (throttle opening degree) is detected by a throttle opening degree sensor 57, and an output of the throttle opening degree sensor 57 is applied to the outboard motor ECU 11. The engine 39 further includes an engine speed detecting section 48 for detecting the rotation of the crank shaft to detect the rotational speed N of the engine 39.

A shift actuator (clutch actuator) 52 for changing the shift position of the dog clutch 43*d* is provided in relation to the shift rod 44. The shift actuator 52 is, for example, an electric motor, and its operation is controlled by the outboard motor ECU 11.

Further, a steering actuator 53 which includes, for example, a hydraulic cylinder and is controlled by the outboard motor ECU 11 is connected to a steering rod 47 fixed to the propulsion unit 30. By driving the steering actuator 53, the propulsion unit 30 is pivoted about the steering shaft 35 for the steering operation. The steering actuator 53, the steering rod 47, and the steering shaft 35 define a steering mechanism 50. The steering mechanism 50 includes a steering angle sensor 49 for detecting the steering angle.

A trim actuator (tilt trim actuator) 54 which includes, for example, a hydraulic cylinder and is controlled by the outboard motor ECU 11, is provided between the clamp bracket 32 and the swivel bracket 34. The trim actuator 54 pivots the propulsion unit 30 about the tilt shaft 33 by pivoting the swivel bracket 34 about the tilt shaft 33. Thus, the trim angle of the propulsion unit 30 is changed.

Figure 3:
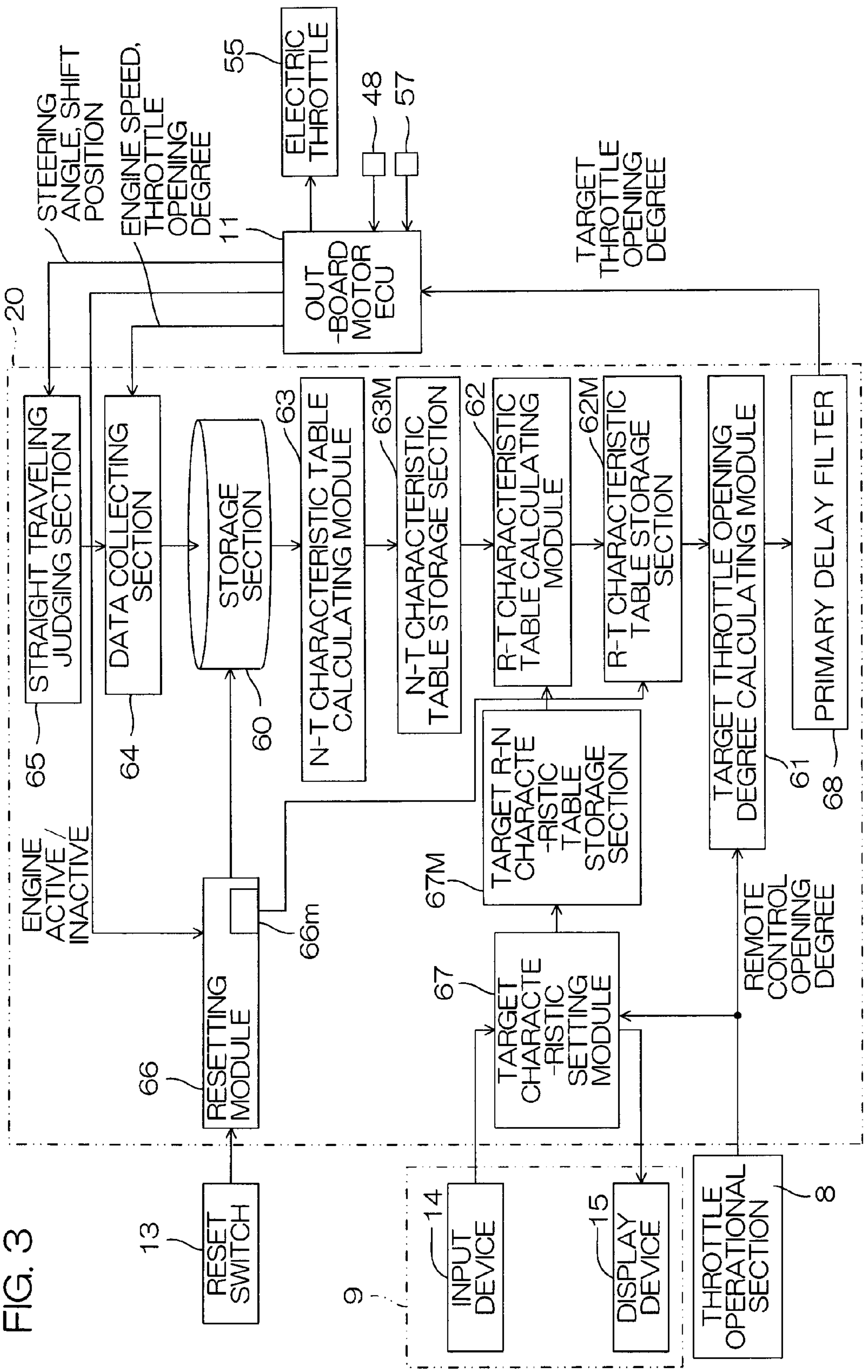
FIG. 3 is a block diagram for explaining an arrangement for controlling an electric throttle.

FIG. 3 is a block diagram for explaining an arrangement for controlling the electric throttle 55. The marine vessel running controlling apparatus 20 preferably includes a microcomputer including a CPU (central processing unit) and a memory, and performs predetermined software-based processes to function virtually as a plurality of functional sections. Such functional sections include a target throttle opening degree calculating module 61 (target throttle opening degree setting unit) which calculates a target throttle opening degree as a target value of the opening degree of the throttle valve 46 (throttle opening degree) according to the operation amount of the remote control lever 8*a* (hereinafter referred to as "remote control opening degree") detected by the lever position detecting section 8*b* of the throttle operational section 8, an R-T characteristic table calculating module 62 (throttle opening degree characteristic setting unit) which calculates a remote control opening degree-target throttle opening degree characteristic (hereinafter referred to as "R-T characteristic") indicating a target throttle opening degree characteristic with respect to the remote control opening degree, an N-T characteristic table calculating module 63 which calculates an engine speed-throttle opening degree characteristic (hereinafter referred to as "N-T characteristic") indicating an actual throttle opening degree characteristic with respect to the engine speed, a data collecting section 64 which collects data of the engine speed and the throttle opening degree from the outboard motor ECU 11 for the calculation of the N-T characteristic, and a straight traveling judging section 65 (straight traveling judging unit) which receives data of the steering angle and the shift position from the outboard motor ECU 11 and judges whether the marine vessel 1 is in a straight traveling state. Further, a storage section 60 for storing the data of the engine speed and the throttle opening degree collected by the data collecting section 64 as learning data is provided in the memory of the marine vessel running controlling apparatus 20. The functional sections further include a resetting module 66 which resets the learning data stored in the storage section 60, and a target characteristic setting module 67 (target characteristic setting unit, target characteristic curve updating unit) which determines a target characteristic for a remote control opening degree-engine speed characteristic (hereinafter referred to as "R-N characteristic") indicating an engine speed characteristic with respect to the remote control opening degree. The functional sections further include a primary delay filter 68 for minimizing a sudden change in an engine output occurring due to a sudden change in the throttle opening degree when the R-T characteristic is changed. In this preferred embodiment, the data collecting section 64 and the N-T characteristic table calculating module 63 define an engine characteristic measuring unit.

The memory of the marine vessel running controlling apparatus 20 includes the aforementioned storage section 60 as well as an R-T characteristic table storage section 62M (throttle opening degree characteristic storage unit) which stores an R-T characteristic table (control information related to the opening degree of the electric throttle), an N-T characteristic table storage section 63M (engine characteristic storage unit) which stores an N-T characteristic table, and an R-N characteristic table storage section 67M (target characteristic storage unit) which stores a target R-N characteristic table. The N-T characteristic table calculating module 63 stores a calculated N-T characteristic table in the N-T characteristic table storage section 63M. Further, the target characteristic setting module 67 stores a target R-N characteristic table in the R-N characteristic table storage section 67M. The R-T characteristic table calculating module 62 calculates an R-T characteristic table based on the N-T characteristic table stored in the N-T characteristic table storage section 63M and the target R-N characteristic table stored in the target R-N characteristic table storage section 67M, and stores the calculated R-T characteristic table in the R-T characteristic table storage section 62M. Further, the target throttle opening degree calculating module 61 calculates the target throttle opening degree for the remote control opening degree based on the R-T characteristic table stored in the R-T characteristic table storage section 62M.

At least the storage section 60, the R-T characteristic table storage section 62M, and the R-N characteristic table storage section 67M, for example, are preferably nonvolatile storage media. An R-T characteristic table defining a linear relationship between the remote control opening degree and the target throttle opening degree, for example, may be initially stored in the R-T characteristic table storage section 62M. Further, a target R-N characteristic table defining a linear relationship between the remote control opening degree and the target engine speed, for example, may be initially stored in the R-N characteristic table storage section 67M.

Although not shown in FIG. 1, a reset switch 13 for applying a reset signal to the resetting module 66 is preferably provided on the control console 6. The target characteristic inputting section 9 provided on the control console 6 provides a man-machine interface for the target characteristic setting module 67, and includes an input device 14 and a display device 15. The display device 15 is preferably a two-dimensional display device such as a liquid crystal display panel or a CRT. Further, the input device 14 may include, for example, a pointing device (e.g., a mouse, a track ball, or a touch panel) for performing an inputting operation on a target characteristic curve displayed on the display device 15, a key inputting section and the like.

If the shift position of the outboard motor 10 is set at the forward drive position or at the reverse drive position and the steering angle falls within a predetermined neutral range (e.g., a range defined between a position spaced about 5 degrees from a neutral position to a port side and a position spaced about 5 degrees from the neutral position to a starboard side) when the outboard motor 10 is driven to run the marine vessel 1, the straight traveling judging section 65 judges that the marine vessel 1 is in the straight traveling state. The data collecting section 64 collects data of the engine speed and the throttle opening degree from the outboard motor ECU 11 in a period during which the straight traveling judging section 65 continuously judges that the marine vessel 1 is in the straight traveling state. More specifically, the data collecting section 64 receives a data pair of the engine speed detected by the engine speed detecting section 48 and the throttle opening degree detected by the throttle opening degree sensor 57 from the outboard motor ECU 11 in a predetermined cycle, and stores the data pair as the learning data in the storage section 60.

The N-T characteristic table calculating module 63 calculates the N-T characteristic table based on the learning data stored in the storage section 60. The R-T characteristic table calculating module 62 calculates the R-T characteristic table based on the N-T characteristic table calculated by the N-T characteristic table calculating module 63 and the target R-N characteristic set by the target characteristic setting module 67. The target throttle opening degree calculating module 61 calculates the target throttle opening degree according to the R-T characteristic table. By driving the electric throttle 55 of the outboard motor 10 with the target throttle opening degree, the relationship between the remote control opening degree and the engine speed conforms to the target R-N characteristic.

It is herein assumed, for example, that a linear target R-N characteristic is set by the target characteristic setting module 67 when the N-T characteristic calculated based on the learning data collected and stored in the storage section 60 by the data collecting section 64 is nonlinear. In this case, the R-T characteristic table calculating module 62 sets a nonlinear R-T characteristic. That is, the target throttle opening degree is nonlinearly changed with respect to the remote control opening degree. The engine speed is nonlinearly changed with respect to the throttle opening degree, so that the engine speed is linearly changed with respect to the remote control opening degree. Since the relationship between the operation amount of the remote control lever 8*a* and the engine output is thus set to be linear, the engine output can be easily set at an intended level by operating the remote control lever 8*a* in an intuitive manner. Thus, even an unskilled operator can properly control the engine output for a desired marine vessel maneuvering operation.

The resetting module 66 preferably includes a nonvolatile memory 66*m* which stores a standard R-T characteristic table. The standard R-T characteristic table defines, for example, a linear R-T characteristic. When the reset switch 13 is operated, the resetting module 66 resets (erases) the learning data in the storage section 60, and reads the standard R-T characteristic table from the nonvolatile memory 66*m* and writes the standard R-T characteristic table in the R-T characteristic table storage section 62M. Thus, a reset operation is performed to reset the R-T characteristic to the standard R-T characteristic.

Engine operation status data indicating whether the engine 39 is in an active state or in an inactive state, for example, is applied to the resetting module 66 from the outboard motor ECU 11. Only when the engine 39 is in the inactive state, the resetting module 66 performs the reset operation upon reception of the reset signal input from the reset switch 13. If the engine 39 is in the active state, the resetting module 66 nullifies the input from the switch 13, and does not perform the reset operation.

The remote control opening degree is herein determined by AD-converting the detected position of the remote control lever 8*a*, and expressed on a scale from 0% to 100%. Similarly, the throttle opening degree is expressed on a scale from 0% to 100%. However, how to express the remote control opening degree and the throttle opening degree is not limited to the aforesaid expression.

Figure 4:
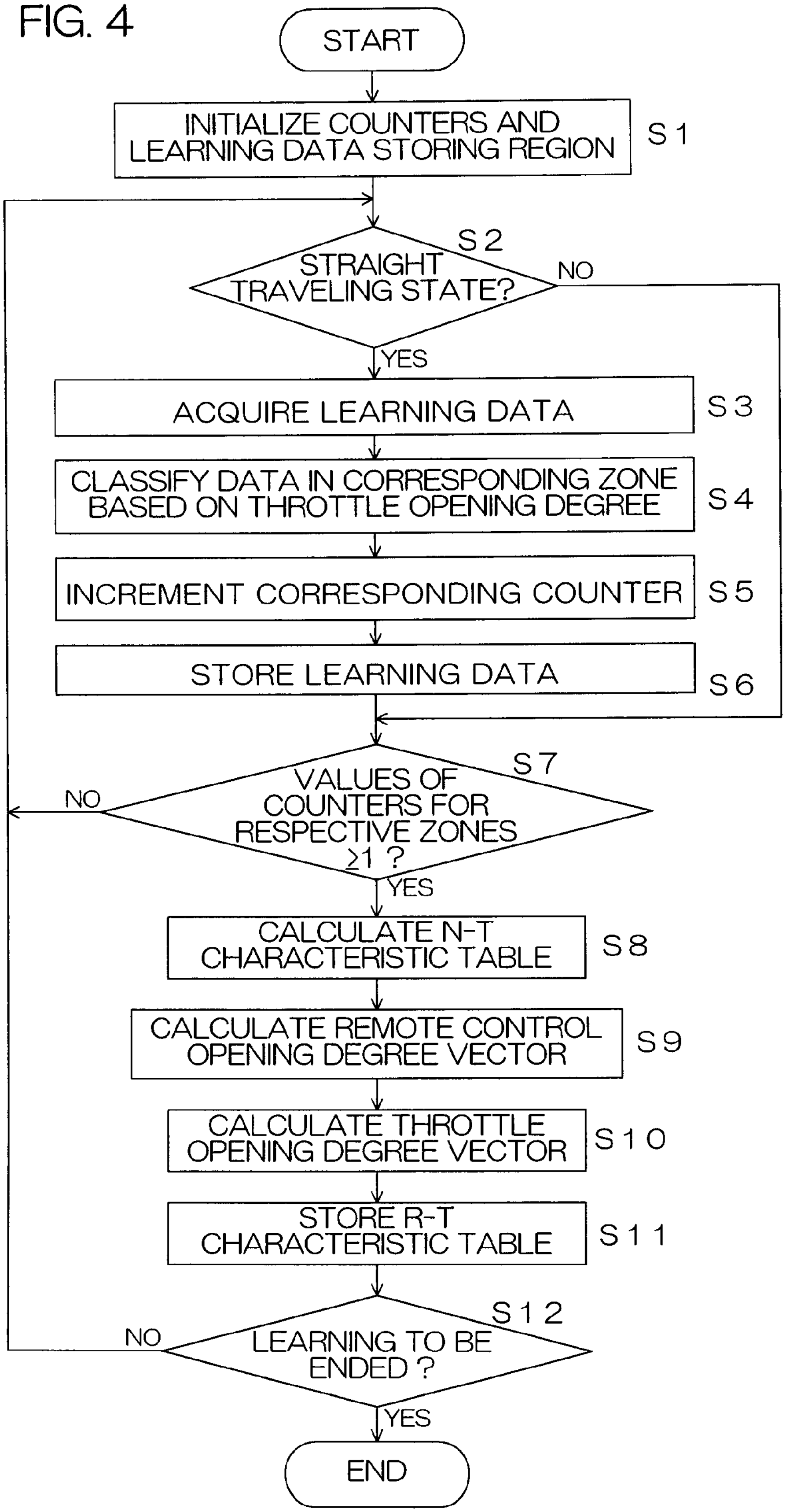
FIG. 4 is a flow chart for explaining the operation of a marine vessel running controlling apparatus.
Figure 5:
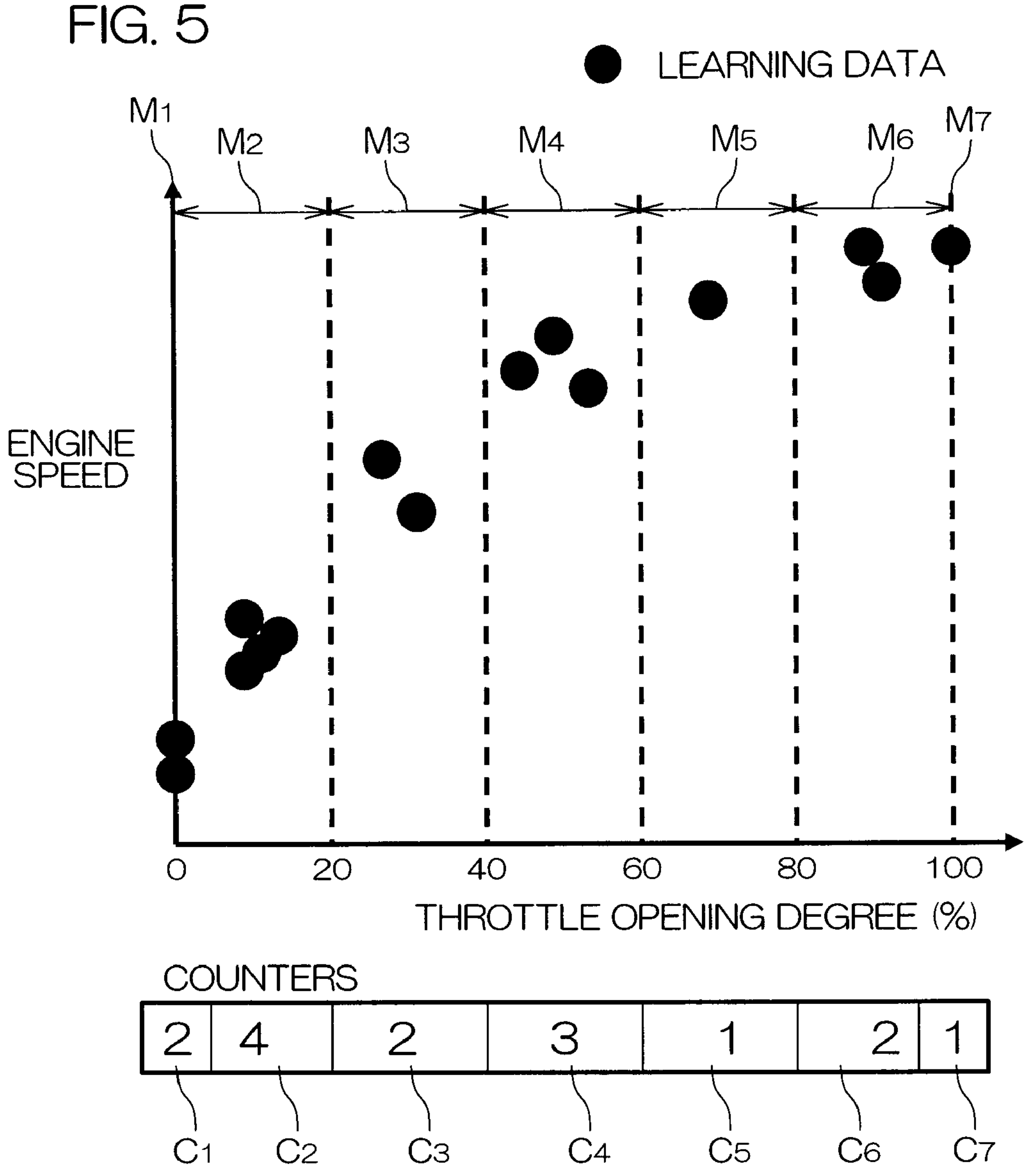
FIG. 5 is a diagram for explaining measurement of an engine speed-throttle opening degree characteristic.

FIG. 4 is a flow chart for explaining the operation of the marine vessel running controlling apparatus 20. A learning data storing region in which the throttle opening degree $\phi$ and the engine speed N are stored as a pair as the learning data ($\phi$, N) and counters $c_i$ (i=1, . . . , m) which respectively count the numbers of learning data pairs classified into m zones $M_1, M_2, \ldots, M_m$ (wherein m is a natural number not smaller than 2) obtained by dividing a throttle opening degree range, are defined in the storage section 60 and initialized by the data collecting section 64 (Step S1). The zones $M_1$ and the counters $c_i$ are shown in FIG. 5. In this preferred embodiment, the throttle opening degree $\phi$ is expressed on a scale from 0% (fully closed state) to 100% (fully open state). In this preferred embodiment, the throttle opening degree range (0% to 100%) is divided into the following seven zones $M_1$ to $M_7$: a first zone $M_1$ of $\phi \leqq 0$; a second zone $M_2$ of $0<\phi\leqq 20$; a third zone $M_3$ of $20<\phi\leqq 40$; a fourth zone $M_4$ of $40<\phi\leqq 60$; a fifth zone $M_5$ of $60<\phi\leqq 80$; a sixth zone $M_6$ of $80<\phi\leqq 100$; and a seventh zone $M_7$ of $\phi\geqq 100$. The counters $c_1$ to $c_7$ are provided in a one-to-one correspondence with the first to seventh zones $M_1$ to $M_7$.

The data collecting section 64 acquires the throttle opening degree $\phi$ and the engine speed N as a pair from the outboard motor ECU 11 (Step S3) if the straight traveling judging section 65 judges that the marine vessel 1 is in the straight traveling state (Step S2). The data collecting section 64 classifies the acquired data pair into a corresponding one of the zones $M_1$ based on the throttle opening degree (Step S4). Then, the data collecting section 64 increments the counter $c_i$ for that zone $M_1$ (Step S5), and stores the data pair in the storage section 60 (Step S6).

The N-T characteristic table calculating module 63 judges whether the counters $C_1$ to $C_7$ for the respective zones each have a value not smaller than a predetermined lower limit value ("1" in this preferred embodiment) (Step S7). If the counters $C_1$ to $C_7$ for the respective zones each have a value not smaller than the predetermined lower limit value, the N-T characteristic table calculating module 63 performs an N-T characteristic table calculating operation (Step S8). If not all the values of the counters $C_1$ to $C_7$ reach the lower limit value, the N-T characteristic table calculating module 63 judges that the learning data is insufficient, and does not perform the N-T characteristic table calculating operation. In this case, a process sequence from Step S2 is repeated.

More specifically, if the counters $c_i$ for the respective zones each have a value not smaller than the lower limit value "1", the N-T characteristic table calculating module 63 calculates engine speed averages $N_i$ and throttle opening degree averages $\phi_i$ as representative data pairs for the respective zones $M_i$ based on the learning data pairs classified in the respective zones $M_i$ from the following expression (1):

$$\overline{\phi}_i = \frac{1}{c_i}\sum_{j=1}^{c_i}\phi_{ij}, \quad \overline{N}_i = \frac{1}{c_i}\sum_{j=1}^{C_i}N_{ij}, \quad i = 1, 2, \ldots, m \tag{1}$$

wherein $\phi$ and N each affixed with an upper line are defined as averages.

Figure 6:
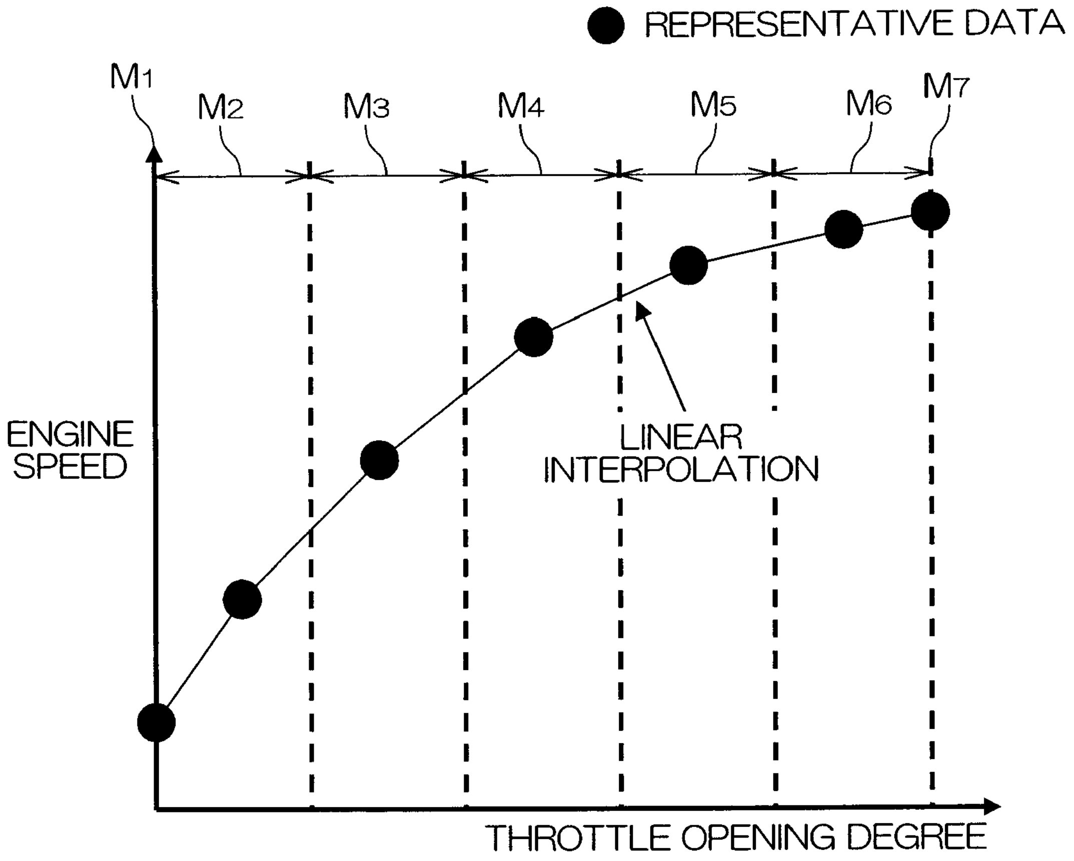
FIG. 6 is a diagram for explaining calculation of the engine speed-throttle opening degree characteristic by way of example.

Thus, a data pair [N, $\phi$] including an m-dimensional average engine speed vector $N=[N_1, N_2, \ldots, N_m]$ and an m-dimensional average throttle opening degree vector $\phi=[\phi_1, \phi_2, \ldots, \phi_m]$ is provided. This is an N-T characteristic table which defines a relationship between the engine speed and the throttle opening degree as shown in FIG. 6. In FIG. 6, the engine speed is steeply increased with an increase in the throttle opening degree in a lower throttle opening degree range and moderately increased with the increase in the throttle opening degree in a higher throttle opening degree range, as observed in the case of an ordinary engine. As required, characteristic data between the actual data is estimated by linear interpolation.

On the other hand, the R-T characteristic table calculating module 62 calculates an 1-dimensional remote control opening degree vector $\theta$ (wherein l (ell) is a natural number not smaller than 2) for a remote control opening degree range of 0% (fully closed state) to 100% (fully open state) from the following expression (2) (Step S9). The remote control opening degree vector $\theta$ includes l components $\theta_j$ respectively having values which delimit l-1 zones obtained by equally dividing the remote control opening degree range between 0 and 100. Where l=101, for example, $\theta_j$=0, 1, 2, . . . , 100.

$$\theta_j = \frac{100(j-1)}{l-1}, \quad j = 1, 2, \ldots, l \tag{2}$$

On the other hand, where a linear target R-N characteristic is set by the target characteristic setting module 67, an l-dimensional target engine speed vector N arranged to be linearly changed with respect to the remote control opening degree $\theta$ is given, for example, by the following expression (3). The expression (3) gives l target engine speeds $N_j$ which delimit l-1 zones obtained by equally dividing a target engine speed range defined between a minimum average engine speed $N_1$ and a maximum average engine speed $N_m$. In the expression (3), N and θ each affixed with a symbol "^" are defined as target values. This definition is the same in the following description.

$$\hat{N}_j = \frac{\hat{\theta}_j}{100}(\overline{N}_m - \overline{N}_1) + \overline{N}_1 \quad (3)$$

Figure 7:
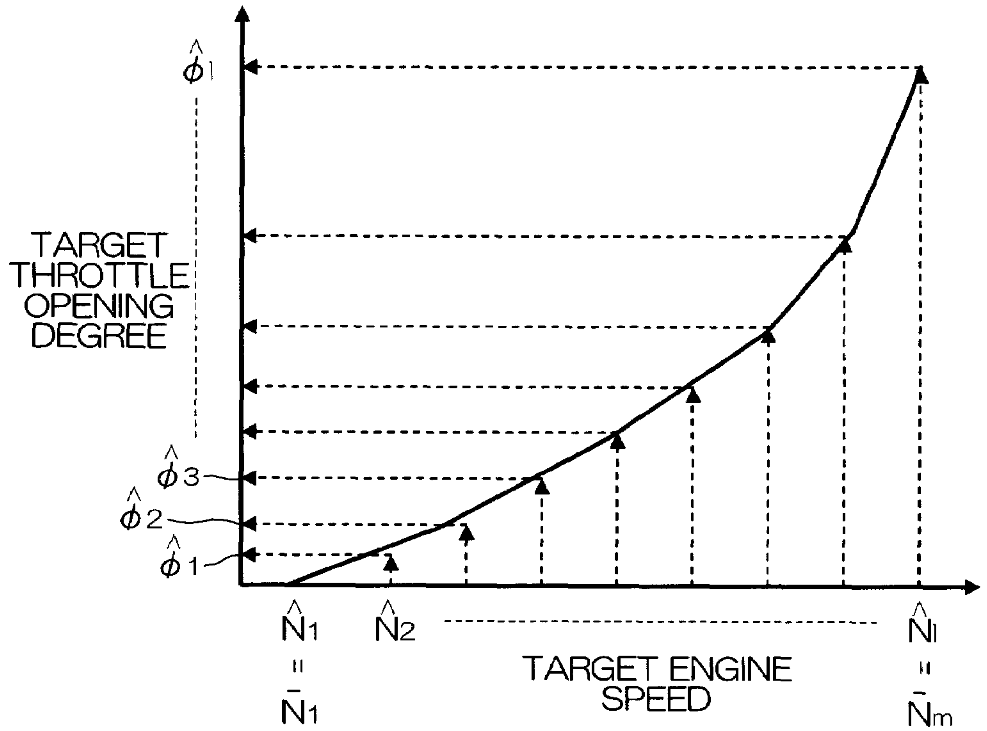
FIG. 7 is a diagram for explaining a target throttle opening degree determining process in which an engine speed in a target characteristic for a remote control opening degree-engine speed characteristic is fitted to an engine speed-throttle opening degree characteristic obtained by actual measurement for determination of a target throttle opening degree.

The R-T characteristic table calculating module 62 determines the throttle opening degrees $\phi_j$ for the target engine speeds $N_j$ obtained from the expression (3) by fitting the target engine speeds $N_j$ to the N-T characteristic table. If corresponding data is not present in the N-T characteristic table, the R-T characteristic table calculating module 62 determines the throttle opening degrees $\phi_j$ by linear interpolation based on proximate data. Thus, an l-dimensional target throttle opening degree vector ϕ is provided (Step S10). A relationship between the target throttle opening degree $\phi_j$ and the target engine speed $N_j$ is shown in FIG. 7.

Figure 8:
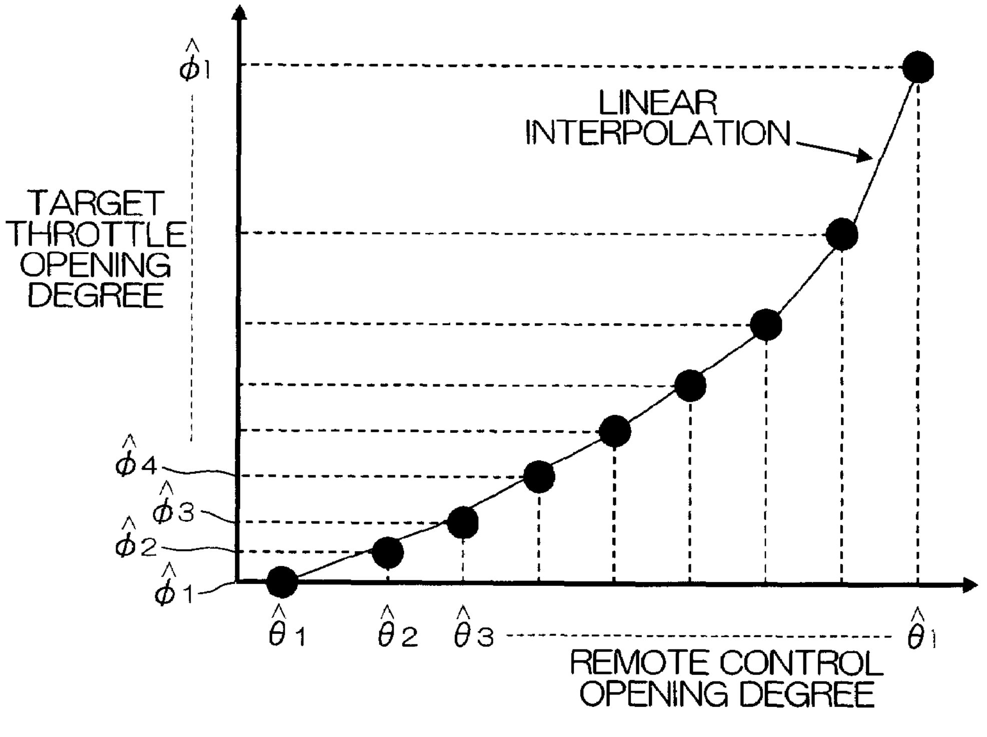
FIG. 8 is a diagram showing an exemplary remote control opening degree-target throttle opening degree characteristic.

In this manner, a data pair (θ, ϕ) of the l-dimensional remote control opening degree vector θ and the l-dimensional target throttle opening degree vector ϕ is provided. The data pair (θ, ϕ) is stored as an R-T characteristic table in the R-T characteristic table storage section 62M (Step S11). Thus, the R-T characteristic table is updated. An example of the R-T characteristic table is shown in FIG. 8. In this example, the throttle opening degree is changed nonlinearly with respect to the remote control opening degree. In a lower opening degree range, a steep change in the throttle opening degree is minimized. In a higher opening degree range, the throttle opening degree is highly responsive to the remote control opening degree. The target throttle opening degree is thus set to be nonlinear with respect to the remote control opening degree, whereby the engine speed of the engine 39 having the nonlinear characteristic as shown in FIG. 6 can be changed linearly with respect to the remote control opening degree.

After the R-T characteristic table is provided, the data collecting section 64 further judges whether the learning is to be ended, i.e., whether the collected learning data is sufficient (Step S12). If the data collecting section 64 judges that the learning is to be continued, a process sequence from Step S2 is repeated. When the R-T characteristic table is provided based on the sufficient learning data, the process ends.

If it is judged in Step S2 that the marine vessel 1 is not in the straight traveling state, Steps S3 to S6 are skipped. That is, the learning data is not collected.

Figure 9:
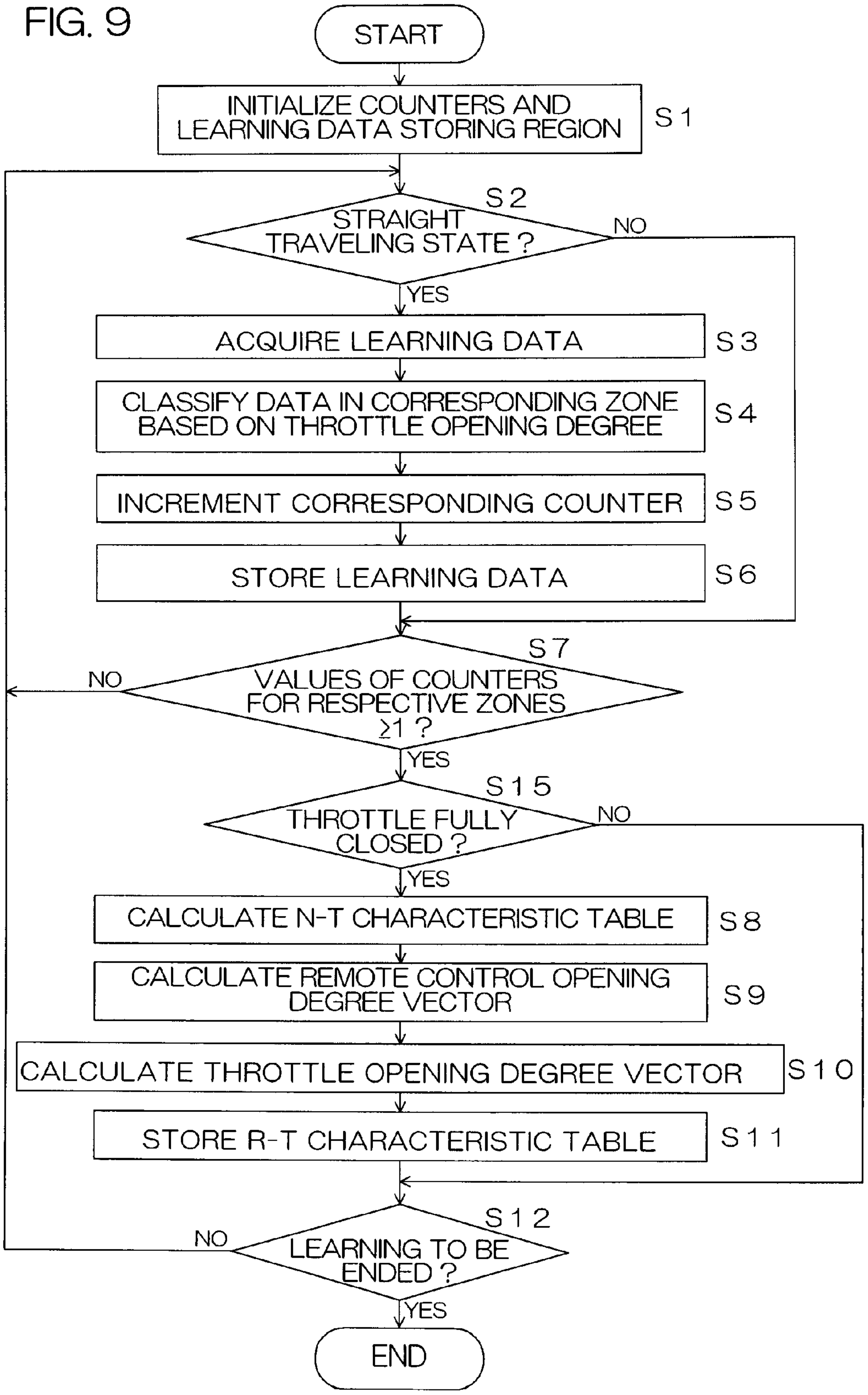
FIG. 9 is a flow chart for explaining an exemplary process for minimizing an uncomfortable feeling which may otherwise occur in a crew of the marine vessel when the remote control opening degree-target throttle opening degree characteristic is changed.
Figure 10:
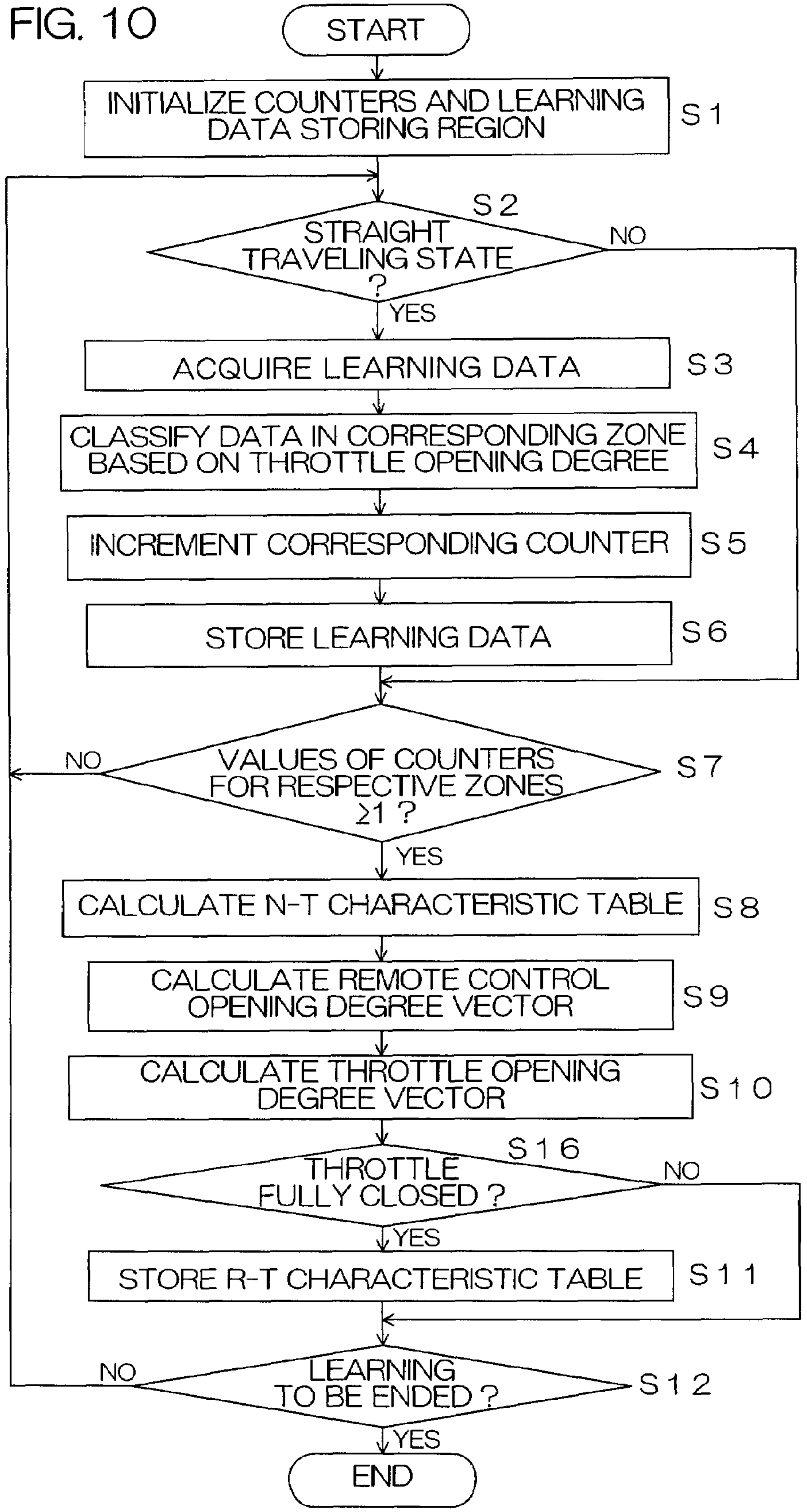
FIG. 10 is a flow chart for explaining another exemplary process for minimizing an uncomfortable feeling which may otherwise occur in the crew when the remote control opening degree-target throttle opening degree characteristic is changed.

Even if the learning data is acquired for the respective zones $M_1$ to $M_7$ to permit the calculation of the R-T characteristic table, the update of the R-T characteristic during the travel of the marine vessel may lead to a sudden change in the engine speed, causing an uncomfortable feeling in the crew of the marine vessel. This problem is eliminated by causing the N-T characteristic table calculating module 63 and the R-T characteristic table calculating module 62 to perform their operations only when the shift position is set at the neutral position, i.e., the throttle opening degree is 0% (Step S15 in FIG. 9). Alternatively, this problem may be eliminated by causing the N-T characteristic table calculating module 63 and the R-T characteristic table calculating module 62 to perform their operations irrespective of the throttle opening degree, and permitting the rewrite of the R-T characteristic table storage section 62M to be referred to by the target throttle opening degree calculating module 61 only when the throttle opening degree is 0% (Step S16 in FIG. 10).

The expression (3) indicating the target R-N characteristic may be generalized by the following expression (4) in the form of a function f(θ).

$$\hat{N} = f(\hat{\theta}) \quad (4)$$

That is, the target R-N characteristic is not limited to the linear characteristic, but may be set to any of various characteristics. Any of these target R-N characteristics is used for performing Steps S9 to S11, whereby the R-T characteristic table is prepared which is adapted to achieve the target R-N characteristic.

Where the N-T characteristic table is completed by the learning (measurement), any of various R-N characteristics can be provided simply by performing Steps S9 to S11.

Figure 11:
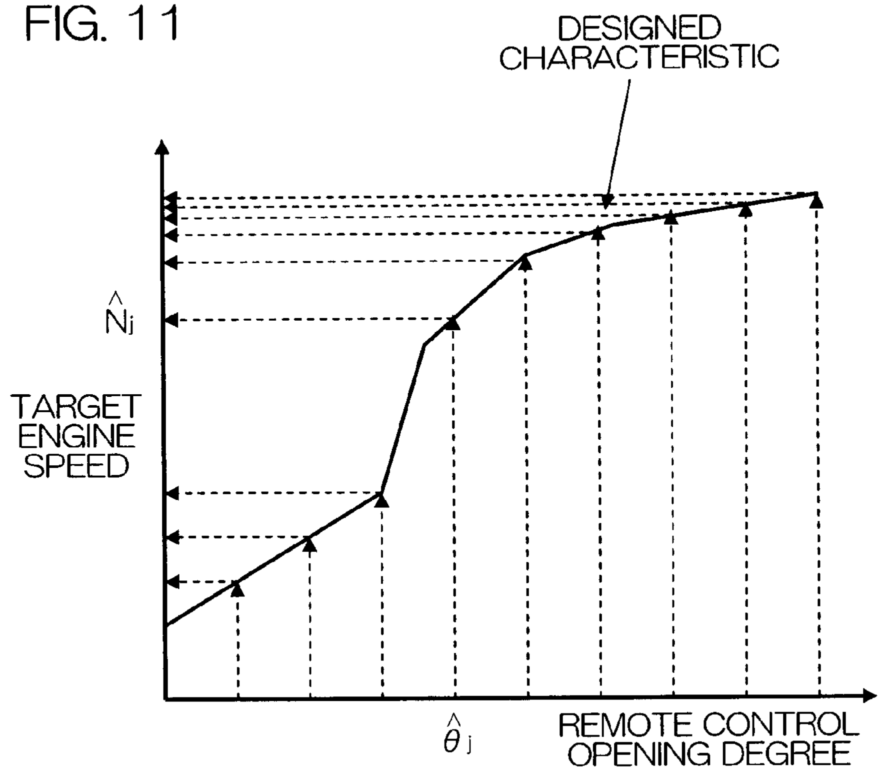
FIG. 11 is a diagram illustrating an exemplary nonlinear target engine speed characteristic with respect to a remote control opening degree.
Figure 12:
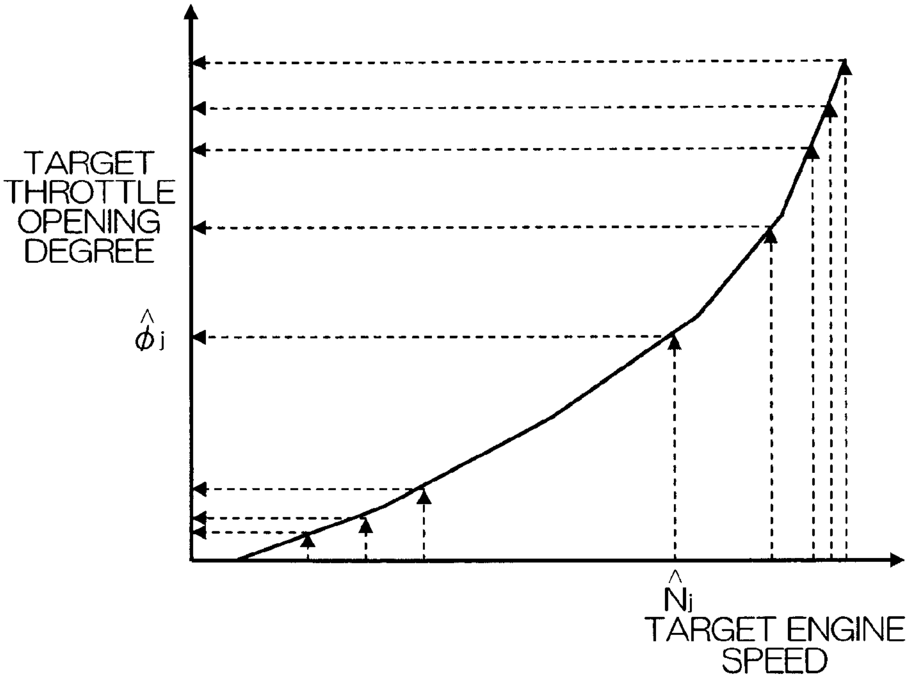
FIG. 12 is a diagram for explaining a process for determining a target throttle opening degree by fitting a target engine speed shown in FIG. 11 to an engine speed-throttle opening degree characteristic obtained by actual measurement.
Figure 13:
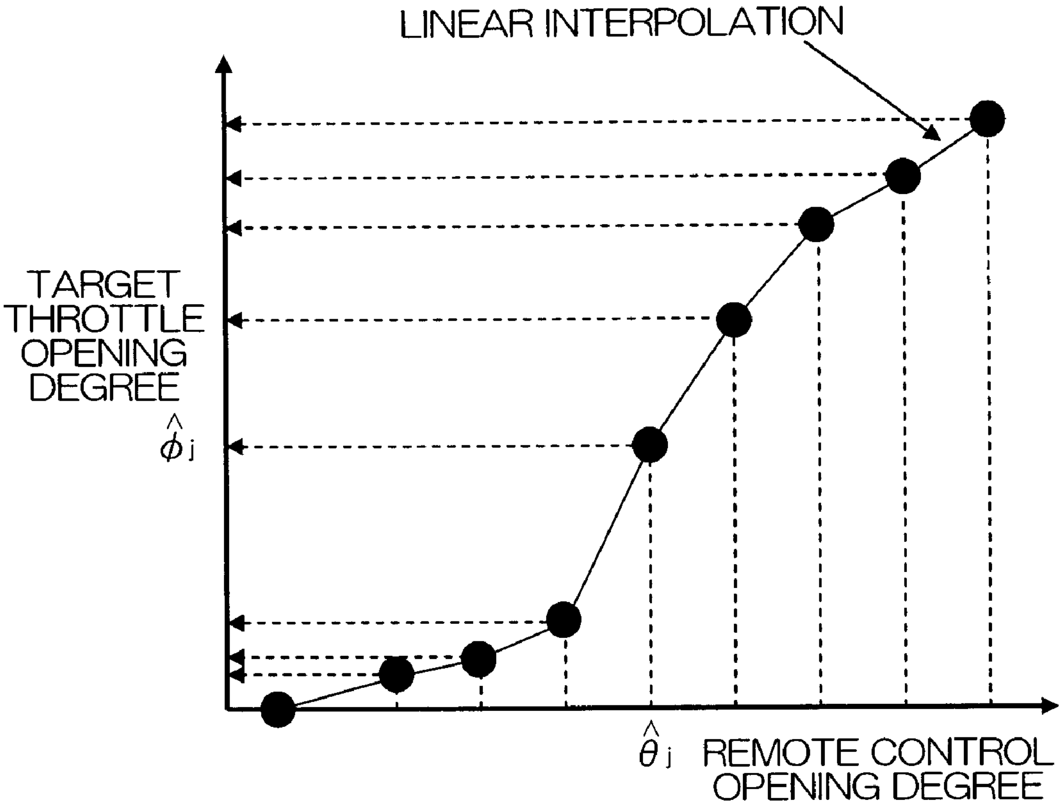
FIG. 13 is a diagram showing an exemplary remote control opening degree-target throttle opening degree characteristic determined by the process explained with reference to FIG. 12.

FIG. 11 is a diagram illustrating an example of a nonlinear target engine speed characteristic with respect to the remote control opening degree (target R-N characteristic). In this example, the target engine speed is minimized to a lower level in the lower opening degree range, and steeply changed with respect to the remote control opening degree in a middle opening degree range. Further, the target engine speed is moderately changed with respect to the remote control opening degree in the higher opening degree range. A remote control opening degree vector θ for this target R-T characteristic is determined by equally dividing the remote control opening degree range according to the expression (2). Then, target engine speeds $N_j$ for respective remote control opening degrees $\theta_j$ are determined to provide a target engine speed vector N. As shown in FIG. 12, the components $N_j$ of the target engine speed vector N are fitted to the N-T characteristic table for determining corresponding target throttle opening degrees $\phi_j$, whereby a target throttle opening degree vector ϕ for the remote control opening degree vector ϕ is provided. Thus, an R-T characteristic table is provided. An example of the R-T characteristic table is shown in FIG. 13. Since the target R-T characteristic is nonlinear, the components $N_j$ of the target engine speed vector N are not equidistantly plotted on the target engine speed axis in FIG. 12.

Next, the operation of the target characteristic setting module 67 will be described.

Figure 14:
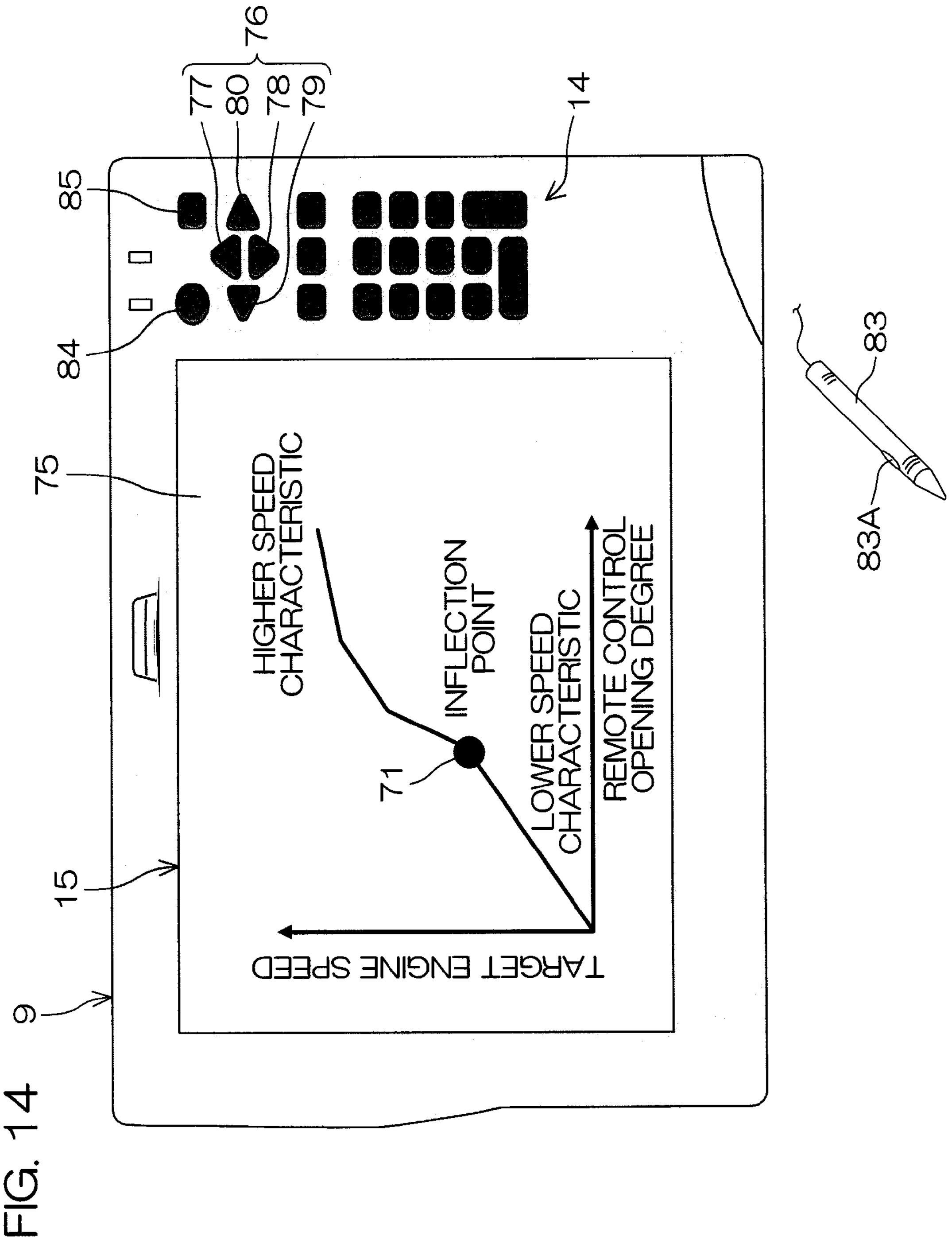
FIG. 14 is a diagram illustrating an exemplary target characteristic inputting section including an input device and a display device in combination.

FIG. 14 is a diagram illustrating an example of the target characteristic inputting section 9 including the input device 14 and the display device 15 in combination. A graph of the target engine speed with respect to the remote control opening degree (target R-N characteristic) is displayed on a screen of the display device 15. In the graph, a target R-N characteristic curve defining the target R-N characteristic has an inflection point 71. A portion of the target R-N characteristic curve in a higher opening degree range (between the inflection point 71 and the remote control opening degree upper limit (fully opened state)) defines a higher speed characteristic, and a portion of the target R-N characteristic curve in a lower opening degree range (between the remote control opening degree lower limit (fully closed state) and the inflection point 71) defines a lower speed characteristic. The operator sets the target characteristic by changing the position of the inflection point 71 and changing the shape of the lower speed characteristic curve portion and/or the shape of the higher speed characteristic curve portion. In this preferred embodiment, however, the operator is permitted to move the inflection point 71 only along a linear portion of the characteristic curve. Where the target R-N characteristic curve is linear or includes a single upward or downward projection and hence has no inflection point, the inflection point 71 is initially positioned, for example, at the median (50%) of the remote control opening degree on the target R-N characteristic curve.

The input device 14 includes a touch panel 75 provided on the screen of the display device 15, a touch pen 83 for operating the touch panel 75, a cross button 76 provided on a lateral side of the screen of the display device 15, a characteristic changing button 84 to be operated to adopt a change made in the target R-N characteristic, and a higher speed characteristic button 85 (to-be-changed portion specifying unit) to be operated when the higher speed characteristic is to be changed. The cross button 76, the characteristic changing button 84, and the higher speed characteristic button 85 define a key input unit.

Figure 15:
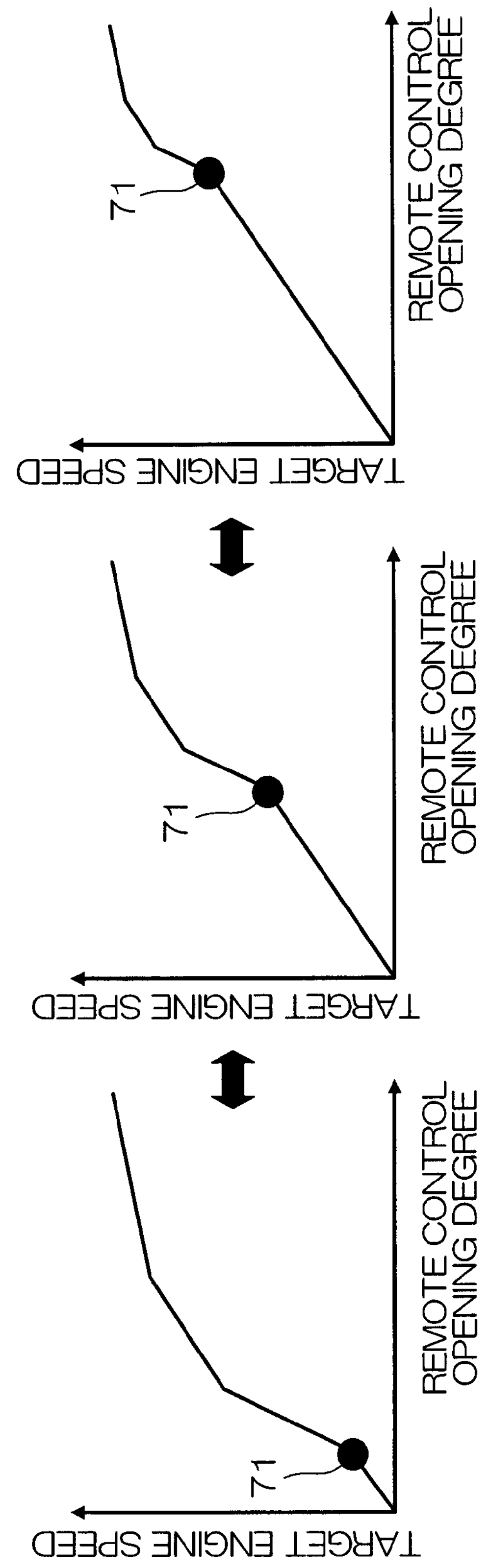
FIG. 15 is a diagram for explaining how to change the position of an inflection point on a target characteristic curve.

The cross button 76 includes upper and lower buttons 77, 78 (curve shape change inputting unit), and left and right buttons 79, 80 (inflection point position change inputting unit). In this preferred embodiment, the inflection point 71 of the target R-N characteristic curve is moved laterally as shown in FIG. 15, for example, by operating the left and right buttons 79, 80 of the cross button 76. In this preferred embodiment, the operation of the left and right buttons 79, 80 causes the inflection point 71 to move along the linear portion of the characteristic curve indicating a linear characteristic of the engine speed with respect to the remote control opening degree.

Figure 16:
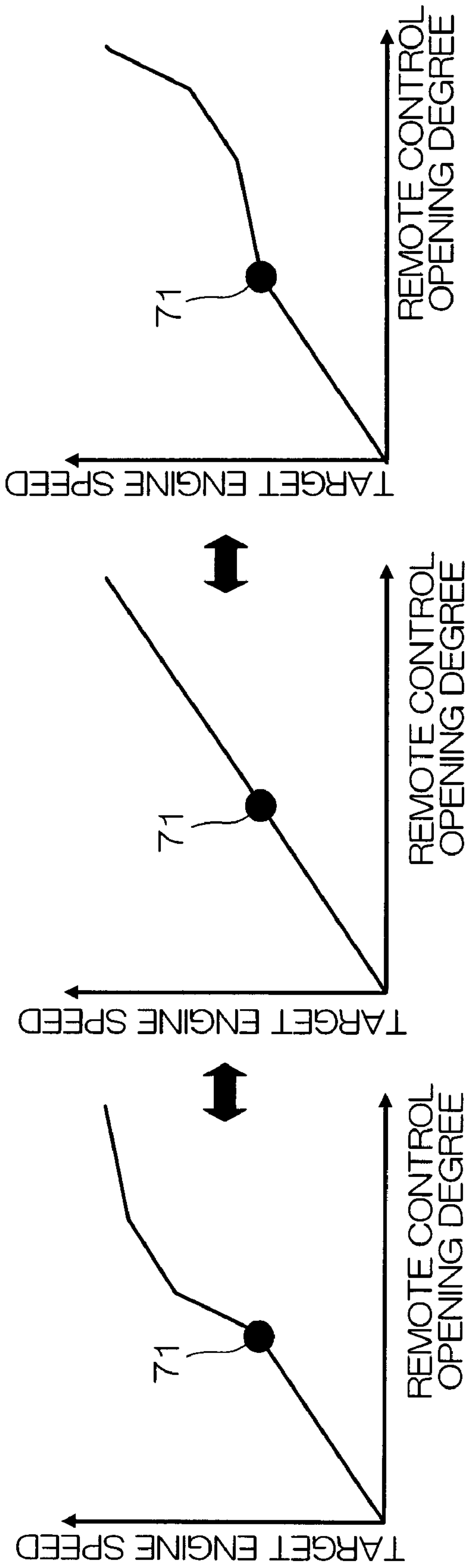
FIG. 16 is a diagram for explaining how to change the shape of the target characteristic curve.

Further, the shape of the target R-N characteristic curve is changed by operating the upper and lower buttons 77, 78 of the cross button 76. Thus, the shape of the R-N characteristic curve is changed as desired. For example, the shape of the R-N characteristic curve can be changed to an upwardly projecting shape (as shown in a left graph in FIG. 16) or a downwardly projecting shape (as shown in a right graph in FIG. 16) based on a linear characteristic (as shown in a middle graph in FIG. 16). At this time, the shape of the higher speed characteristic curve portion can be changed by operating the upper and lower buttons 77, 78 while operating the higher speed characteristic button 85. Further, the shape of the lower speed characteristic curve portion can be changed by operating the upper and lower buttons 77, 78 without operating the higher speed characteristic button 85.

The aforementioned operations can also be performed with the use of the touch panel 75 and the touch pen 83. More specifically, the position of the inflection point 71 is changed along the linear portion of the characteristic curve by pointing the inflection point 71 by the touch pen 83 and laterally dragging the inflection point 71 while pressing a click button 83A provided on the touch pen 83. Further, the shape of the higher speed characteristic curve portion is changed by performing a dragging operation in the higher speed characteristic range, and the shape of the lower speed characteristic curve portion is changed by performing the dragging operation in the low speed characteristic range. Thus, the touch panel 75 and the touch pen 83 serve as the inflection point position change inputting unit and the curve shape change inputting unit.

Figure 17:
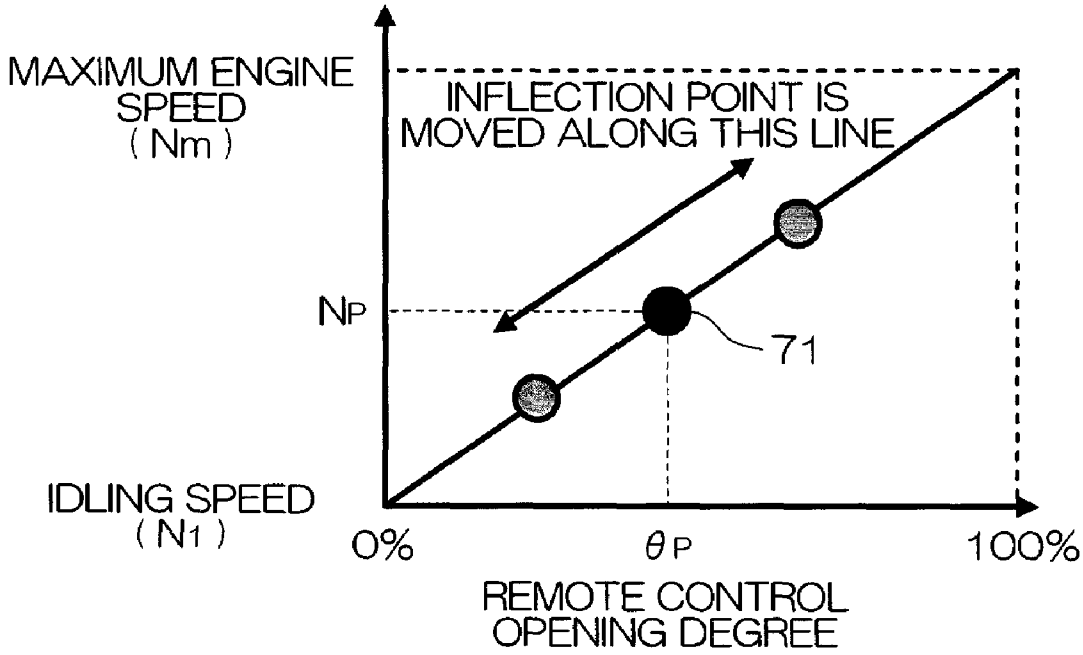
FIG. 17 is a diagram for explaining a straight line defining a linear characteristic and movement of an inflection point on the line.

As shown in FIG. 17, the linear characteristic is defined by a straight line that extends from a point defined by an idling engine speed ($N_1$) observed in a remote control lever fully closed state (θ=0) to a point defined by a maximum engine speed ($N_m$) observed in a remote control lever fully open state (θ=100). When the remote control opening degree $\theta_p$ at the inflection point 71 is determined, the engine speed $N_p$ for the remote control opening degree $\theta_p$ is given by the following expression (5):

$$N_p = \frac{N_m - N_1}{100}\theta_p + N_1 \tag{5}$$

Upon determination of the inflection point ($\theta_p$, $N_p$), the lower speed characteristic is defined by a lower speed characteristic curve portion having opposite ends (0, $N_1$) and ($\theta_p$, $N_p$), and the higher speed characteristic is defined by a higher speed characteristic curve portion having opposite ends ($\theta_p$, $N_p$) and (100, $N_m$). Average values $N_1$ and $N_m$ calculated from the aforementioned expression (1) are used as the values $N_1$ and $N_m$, but other values preliminarily determined may be used as the values $N_1$ and $N_m$.

The higher speed characteristic curve portion and the lower speed characteristic curve portion are defined, for example, by the following expression (6):

$$N = \begin{cases} \left(\frac{\theta}{\theta_p}\right)^{k_l} N_p & \text{Lower speed characteristic} \\ \left(\frac{\theta - \theta_p}{100 - \theta_p}\right)^{k_h} (N_m - N_p) + N_p & \text{Higher speed characteristic} \end{cases} \tag{6}$$

wherein $k_l$ and $k_h$ are setting parameters which are variable in ranges of $0.1 \leqq k_l$ and $k_h \leqq 10$. Where $k_h=1$, the engine speed characteristic is linear.

The inflection point may preferably be set at an engine speed (e.g., about 2000 rpm) which is slightly lower than an engine speed generally used for increasing the speed of the marine vessel over the hump range (a speed range in which a wave-making resistance is maximum). By thus setting the inflection point, it is possible to provide a lower speed characteristic suitable for maneuvering the marine vessel at a lower traveling speed below the hump range (e.g., for moving the marine vessel toward or away from a docking site or for trolling) as well as a higher speed characteristic suitable for maneuvering the marine vessel at a traveling speed higher than the hump range (e.g., for long-distance cruising).

The lower speed characteristic, which is adapted for an engine speed range generally used for moving the marine vessel toward or away from a docking site or for trolling, should be set by giving primary consideration to the maneuverability of the marine vessel. In general, the lower speed characteristic is set to be linear, or determined such that the engine speed is less liable to increase even if the remote control lever 8*a* is substantially operated. This prevents the steep increase in the engine speed, and facilitates the fine control of the engine output.

On the other hand, the higher speed characteristic is adapted for an engine speed range generally used when the engine is required to have higher responsiveness, e.g., when the marine vessel travels at a relatively high speed or travels on high waves. In general, the higher speed characteristic is set to be linear, or determined such that the engine speed is more liable to increase with higher responsiveness even if the remote control lever is slightly operated. Thus, a desired engine output can be provided quickly in response to the operation of the remote control lever 8*a* without fully inclining the remote control lever 8*a*. Therefore, the higher speed characteristic thus set is effective, for example, when the marine vessel travels over waves on rough seas. Since the inflection point is set in the lower engine speed range lower than the hump range, the marine vessel can be easily brought into a planing state (in which a frictional resistance is predominant with a reduced wave-making resistance).

As described above, the target characteristic curve may have an upward or downward projection with respect to the linear characteristic. In this preferred embodiment, however, the following restrictions 1 to 3 are preferably imposed for setting the lower and higher speed characteristics on opposite sides of the inflection point.

Restriction 1: If one of the lower speed characteristic curve portion and the higher speed characteristic curve portion projects upward, the other characteristic curve portion should be linear or project downward.

Restriction 2: If one of the lower speed characteristic curve portion and the higher speed characteristic curve portion projects downward, the other characteristic curve portion should be linear or project upward.

Restriction 3: If one of the lower speed characteristic curve portion and the higher speed characteristic curve portion is linear, the other characteristic curve portion may be linear or project upward or downward.

These restrictions prevent the lower and higher speed characteristic curve portions on the opposite sides of the inflection point from projecting in the same direction (upward or downward), thereby ensuring continuity of the lower and higher speed characteristic curve portions. Where it is desired to set the target characteristic such that the characteristic curve projects upward or downward over the entire remote control opening degree range, the setting of the characteristic curve may be achieved by setting the inflection point at the idling engine speed, i.e., at a remote control opening degree of 0%, and then setting the higher speed characteristic curve portion. Alternatively, the setting of the characteristic curve may be achieved by setting the inflection point at the maximum engine speed, i.e., at a remote control opening degree of 100%, and then setting the lower speed characteristic curve portion.

The target R-N characteristic curve may be set when the marine vessel is in a stopped state or in a traveling state.

Figure 18:
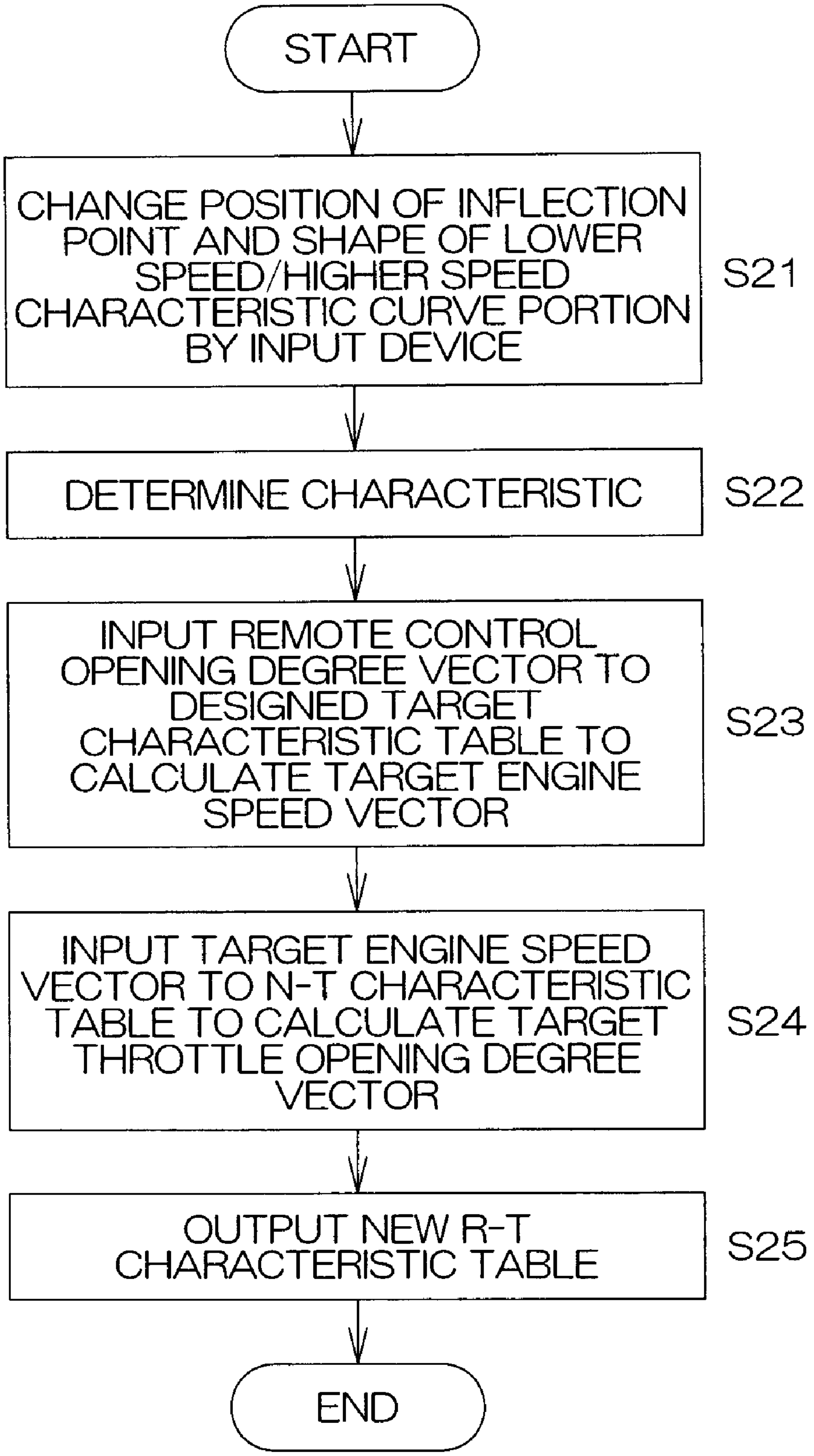
FIG. 18 is a flow chart for explaining a process to be performed for setting the target characteristic curve when the marine vessel is in a stopped state.

FIG. 18 is a flow chart for explaining a process to be performed for setting the target R-N characteristic curve when the marine vessel is in the stopped state (when the shift position is set at the neutral position). The operator checks the target R-N characteristic curve displayed on the display device 15, and performs a characteristic curve setting operation with the use of the touch panel 75 or the cross button 76. When the operator specifies the inflection point 71 and laterally moves the inflection point 71 on the touch panel 75 (see FIG. 17), for example, the inflection point 71 is moved along the linear characteristic curve. When the operator specifies the higher speed characteristic curve portion or the lower speed characteristic curve portion and moves up or down the characteristic curve portion on the touch panel 75, the characteristic curve portion is caused to project upward or downward (Step S21).

After roughly setting the characteristic curve, the operator presses the characteristic changing button 84 (Step S22). In response to the pressing of the characteristic changing button 84, the target characteristic setting module 67 generates a target characteristic table according to the setting of the characteristic curve, and stores the generated target characteristic table in the target R-N characteristic table storage section 67M. The R-T characteristic table calculating module 62 inputs a remote control opening degree vector θ to the generated target characteristic table, and calculates a target engine speed vector N (Step S23). Further, the R-T characteristic table calculating module 62 inputs the target engine speed vector N to the N-T characteristic table, and calculates a target throttle opening degree vector ϕ (Step S24). The resulting vector pair (θ, ϕ) is stored as an updated R-T characteristic table in the R-T characteristic table storage section 62M (Step S25).

When the remote control lever 8*a* is thereafter operated to set the shift position at the forward drive position or at the reverse drive position, the target throttle opening degree calculating module 61 sets the target throttle opening degree according to the new R-T characteristic table stored in the R-T characteristic table storage section 62M. Thus, the output of the engine 39 (engine speed) is controlled according to the target R-N characteristic set by the operator.

Figure 19:
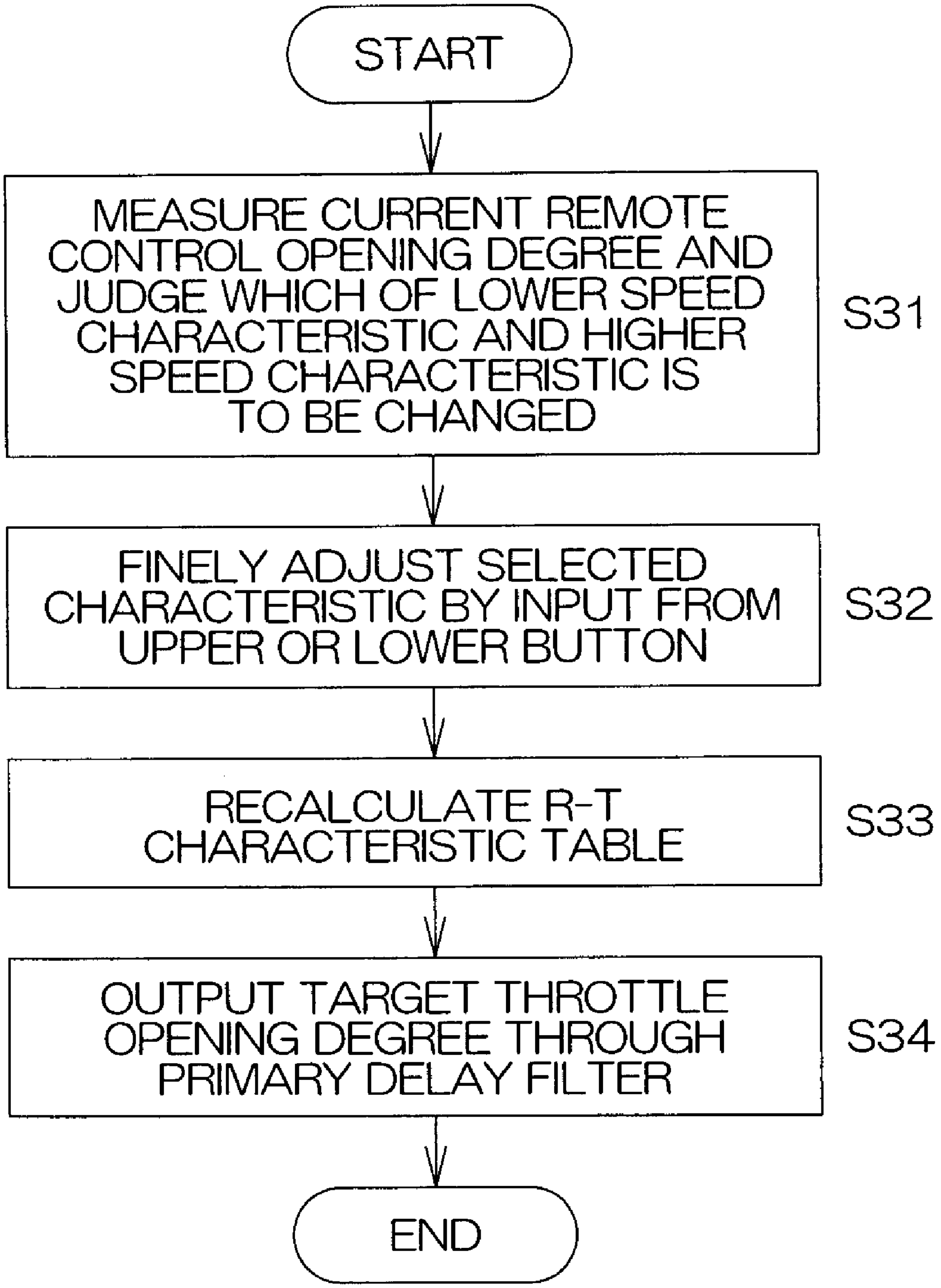
FIG. 19 is a flow chart for explaining a process to be performed for setting the target characteristic curve when the marine vessel is in a traveling state.
Figure 20:
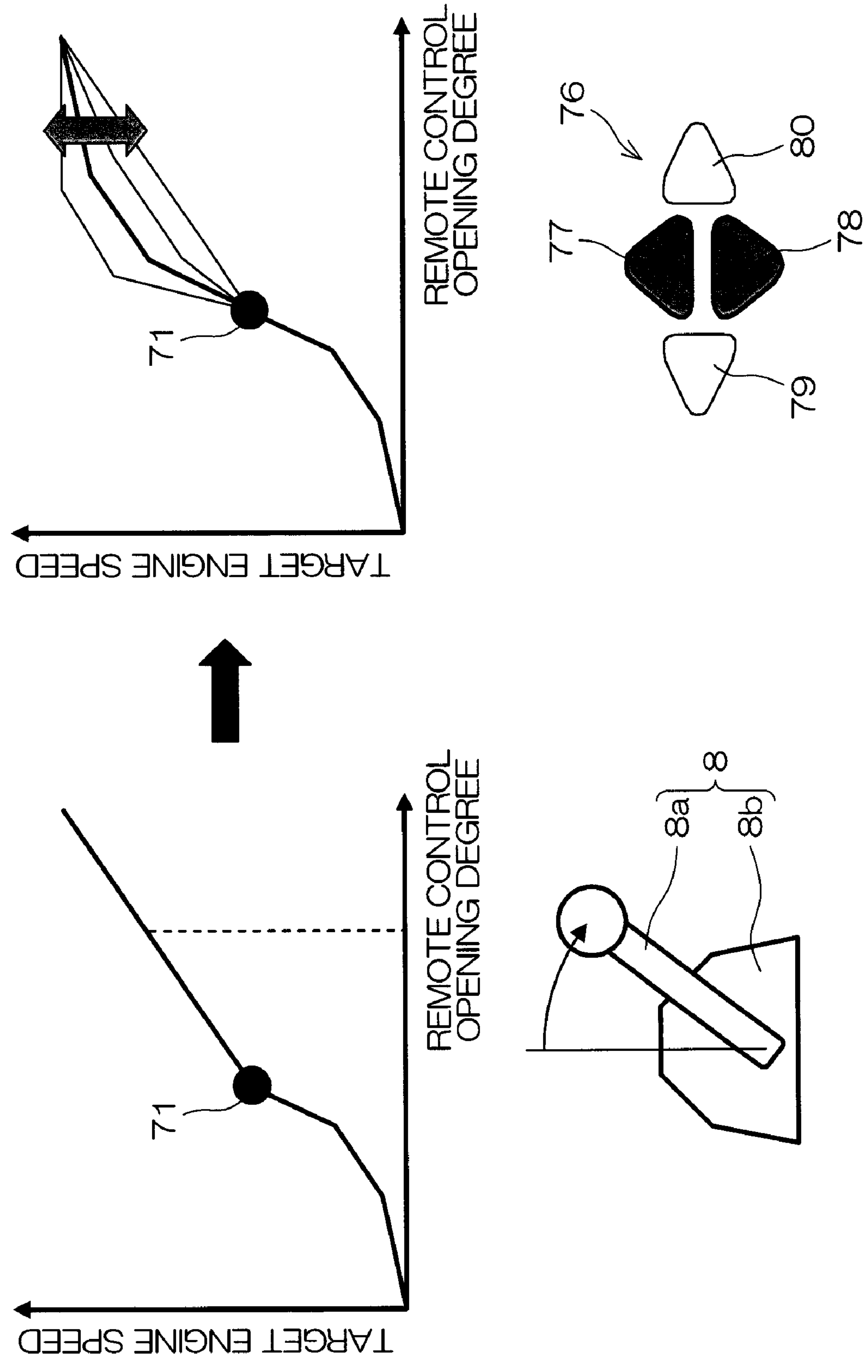
FIG. 20 is a diagram for explaining a process for finely adjusting the target characteristic curve with the use of a remote control lever and a cross button.

FIG. 19 is a flow chart for explaining a process to be performed for setting the target R-N characteristic curve when the marine vessel is in the traveling state (when the shift position is set at a non-neutral position, i.e., the forward drive position or the reverse drive position). The target characteristic setting module 67 judges, based on an output from the throttle operational section 8 and a currently used target R-N characteristic (target R-N characteristic table), whether a current remote control opening degree is in the higher speed characteristic region or in the lower speed characteristic region (Step S31). When the operator desires to finely adjust the target characteristic to cause the target characteristic curve to project upward, as shown in FIG. 20 (which shows an operation for changing the higher speed characteristic by way of example), the operator presses the upper button 77 of the cross button 76 without moving the remote control lever 8*a*. Every time the upper button 77 is pressed, the upwardly projecting degree of the lower speed characteristic curve portion or the higher speed characteristic curve portion is increased depending on the result of the judgment in Step S31. Thus, a new target characteristic is provided, and stored in the target R-N characteristic table storage section 67M (Step S32). The R-T characteristic table calculating module 62 recalculates the R-T characteristic table according to the new target characteristic (Step S33). When the operator desires to finely adjust the target characteristic to cause the target characteristic curve to project downward, the operator presses the lower button 78 of the cross button 76 without moving the remote control lever 8*a*. Every time the lower button 78 is pressed, the downwardly projecting degree of the lower speed characteristic curve portion or the higher speed characteristic curve portion is increased depending on the result of the judgment in Step S31. Thus, a new target characteristic is provided, and stored in the target R-N characteristic table storage section 67M (Step S32). The R-T characteristic table calculating module 62 recalculates the R-T characteristic table according to the new target characteristic (Step S33). When the marine vessel is in the traveling state, the throttle operational section 8 doubles as the to-be-changed portion specifying unit for selecting one of the lower speed characteristic curve portion and the higher speed characteristic curve portion on which a shape changing operation is performed.

The target throttle opening degree calculating module 61 calculates the target throttle opening degree according to the finely adjusted R-T characteristic table. The target throttle opening degree is applied to the outboard motor ECU 11 via the primary delay filter 68 (Step S34).

Thus, the operator can finely adjust the target characteristic while checking the behavior of the engine 39 responsive to the operation of the remote control lever 8*a* during the travel of the marine vessel 1.

If the throttle opening degree is suddenly changed due to the change in the R-T characteristic table during the travel of the marine vessel, the engine output is suddenly changed, thereby causing an unnatural feeling in the crew. In order to prevent the sudden change in the throttle opening degree, the primary delay filter 68 is provided for minimizing a stepped change in the target throttle opening degree in this preferred embodiment. Therefore, the target throttle opening degree passed through the primary delay filter 68 is output as the final target throttle opening degree to the outboard motor ECU 11. The primary delay filter 68 is operative only for a predetermined period (e.g., 5 seconds) which is required for minimizing the influence of the stepped change occurring in the target characteristic due to the recalculation during the travel of the marine vessel.

Although the primary delay filter 68 is preferably used in this preferred embodiment, the stepped change in the target throttle opening degree may be minimized in other ways. For example, the throttle opening degree may be gradually changed from the current level to the target level through linear interpolation based on the current throttle opening degree and the recalculated target throttle opening degree.

Figure 21:
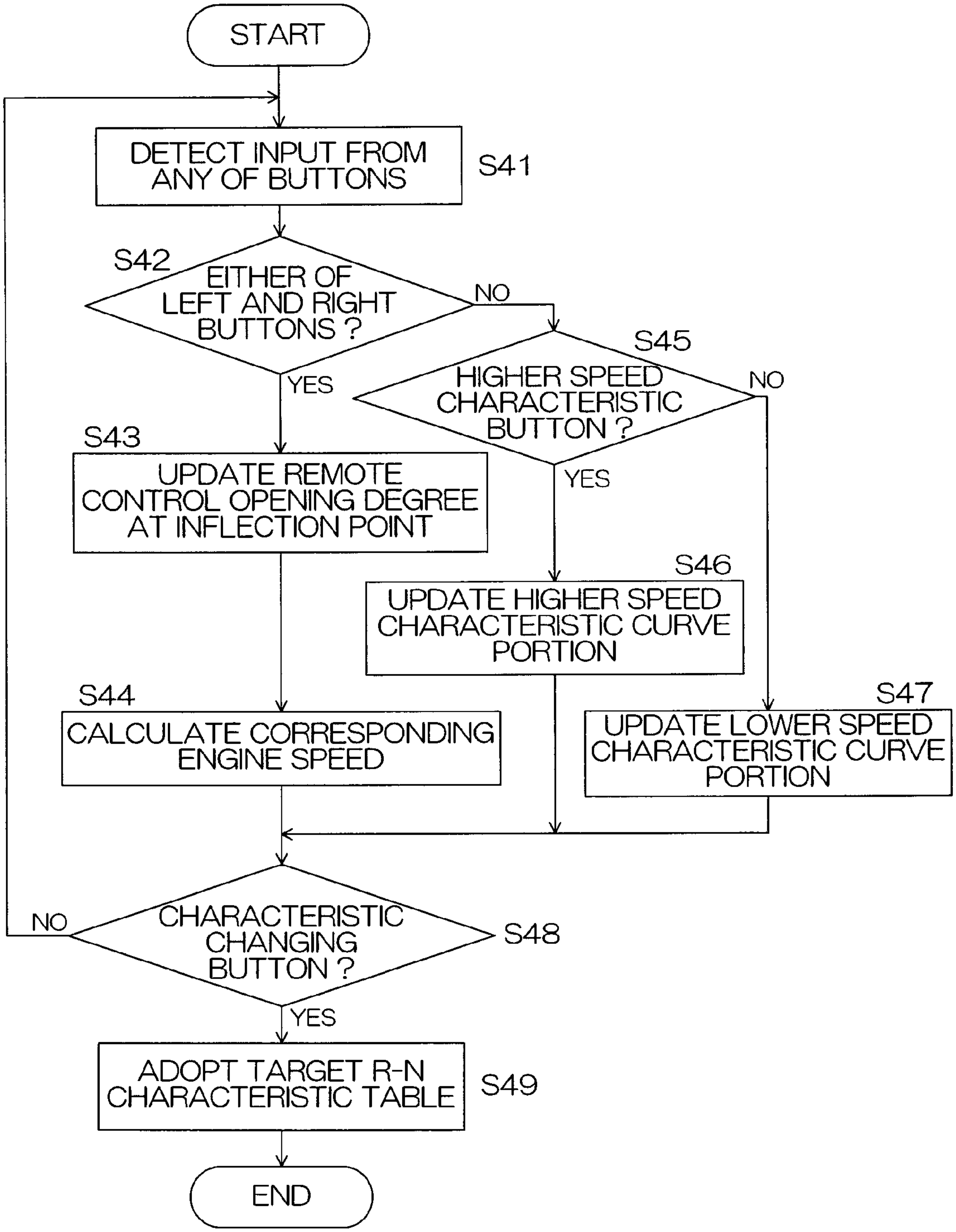
FIG. 21 is a flow chart for explaining an exemplary process for modifying a target characteristic table with the use of the cross button.

FIG. 21 is a flow chart for explaining an exemplary process to be performed by the target characteristic setting module 67 for changing the target R-N characteristic table by means of the cross button 76. The target characteristic setting module 67 monitors an input from any of the buttons (Step S41). If an input from any of the buttons is detected, the target characteristic setting module 67 judges whether either of the left and right buttons 79, 80 of the cross button 76 is pressed (Step S42). If either of the left and right buttons 79, 80 is pressed, the remote control opening degree $\theta_p$ at the inflection point is updated based on the following expression (7) (Step S43) to provide a new remote control opening degree $\theta_{pNEW}$. In the expression (7), $\Delta\theta$ is a change amount (a constant value in this preferred embodiment) observed when either of the left and right buttons 79, 80 is pressed once. For example, $\Delta\theta$ may be +5% when the right button 80 is pressed, and may be −5% when the left button 79 is pressed.

$$\theta_{pNEW}=\theta_p+\Delta\theta \quad (7)$$

The target characteristic setting module 67 further determines an engine speed $N_p$ for the remote control opening degree $\theta_p$ at the updated inflection point from the aforementioned expression (5) (Step S44). Thus, the updated inflection point is defined by the new engine speed and the new remote control opening degree.

If neither of the left and right buttons 79, 80 is pressed in step S42, it is considered that either of the upper and lower buttons 77, 78 is pressed. In this case, the target characteristic setting module 67 further judges whether the higher speed characteristic button 85 is pressed (Step S45).

If the higher speed characteristic button 85 is pressed, the setting parameter $k_h$ in the expression (6) is updated to a new parameter $k_{hNEW}$ obtained from the following expression (8). Thus, the higher speed characteristic curve portion is updated (Step S46).

$$k_{hNEW}=k_h+\Delta k_h \quad (8)$$

wherein $\Delta k_h$ is a change amount (a constant value in this preferred embodiment) observed when either of the upper and lower buttons 77, 78 is pressed once. Where $k_h \leqq 1$, for example, $\Delta k_h$ may be set to −0.1 when the upper button 77 is pressed, and may be set to +0.1 when the lower button 78 is pressed. Further, where $k_h>1$, $\Delta k_h$ may be set to −1 when the upper button 77 is pressed, and may be set to +1 when the lower button 78 is pressed.

If the higher speed characteristic button 85 is not pressed, the setting parameter $k_l$ in the expression (6) is updated to a new parameter $k_{lNEW}$ obtained from the following expression (9). Thus, the lower speed characteristic curve portion is updated (Step S47).

$$k_{lNEW}=k_l+\Delta k_l \quad (9)$$

wherein $\Delta k_l$ is a change amount (a constant value in this preferred embodiment) observed when either of the upper and lower buttons 77, 78 is pressed once. Where $k_l \leqq 1$, for example, $\Delta k_l$ may be set to −0.1 when the upper button 77 is pressed, and may be set to +0.1 when the lower button 78 is pressed. Further, where $k_l>1$, $\Delta k_l$ may be set to −1 when the upper button 77 is pressed, and may be set to +1 when the lower button 78 is pressed.

Further, the target characteristic setting module 67 judges whether the characteristic changing button 84 is pressed (Step S48). If the characteristic changing button 84 is not pressed, a process sequence from Step S41 is repeated to receive an input from the operator for changing the position of the inflection point and/or for updating the higher speed characteristic curve portion and/or the lower speed characteristic curve portion.

If the characteristic changing button 84 is pressed, the target characteristic setting module 67 adopts the thus set characteristic as the target R-N characteristic table (Step S49), and stores the target R-N characteristic table in the target R-N characteristic table storage section 67M. Then, the target characteristic setting process ends.

Next, a process to be performed by the target characteristic setting module 67 based on an input from the touch panel 75 will be described. An input operation is performed on the touch panel 75 by directly touching the screen of the display device 15 by the touch pen 83. However, the input operation may be performed with the use of a pointing device such as a mouse.

Figure 22:
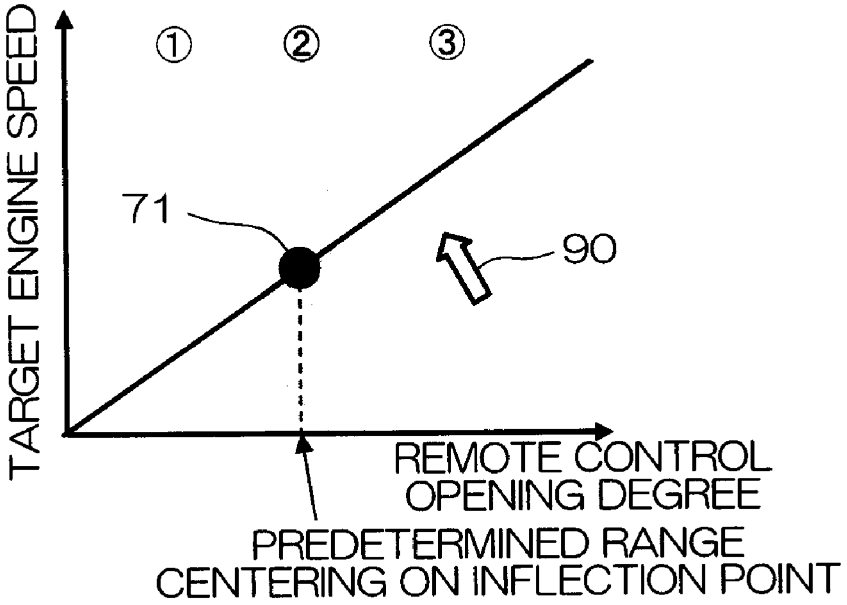
FIG. 22 is a diagram for explaining operating regions to be operated when the target characteristic table is modified on a touch panel.

As shown in FIG. 22, the display screen of the display device 15 is divided into the following three regions: an inflection point operating region (2) defined by a predetermined range centering on the remote control opening degree $\theta_p$ at the inflection point; a lower speed characteristic operating region (1) located on a left side of the inflection point operating region; and a higher speed characteristic operating region (3) located on a right side of the inflection point operating region. More specifically, these regions are defined as follows:

Lower speed characteristic operating region $$0 \leqq \theta < \theta_p - 5$$

Inflection point operating region $$\theta_p - 5 \leqq \theta \leqq \theta_p + 5$$

Higher speed characteristic operating region $$\theta_p + 5 < \theta \leqq 100$$

Figure 23:
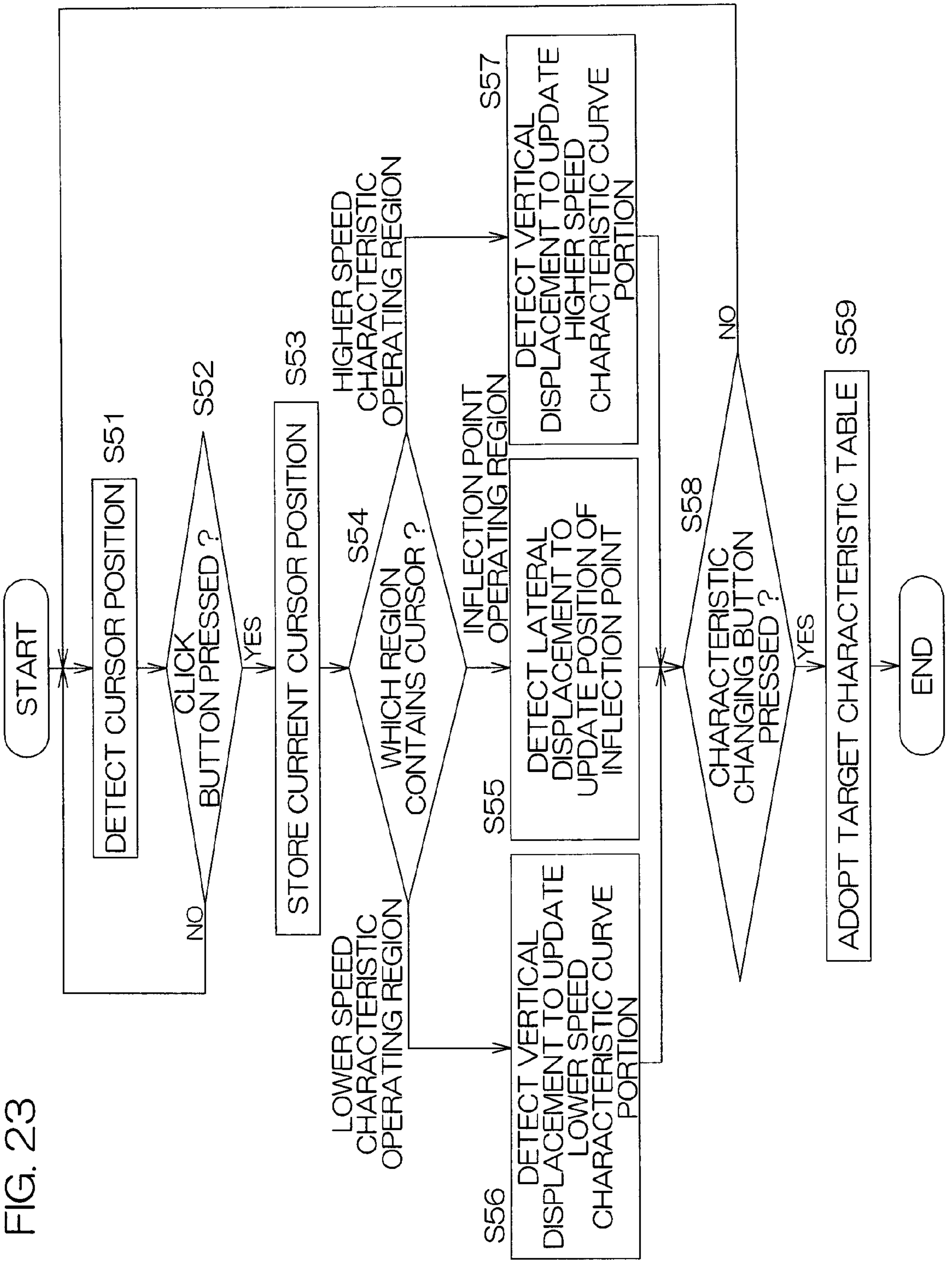
FIG. 23 is a flow chart for explaining an exemplary process for modifying the target characteristic table on the touch panel.

FIG. 23 is a flow chart for explaining an exemplary process to be performed by the target characteristic setting module 67 based on the input from the touch panel 75. First, the target characteristic setting module 67 detects the position of a cursor 90 (see FIG. 22) displayed on the screen of the display device 15 (a point currently touched or finally touched by the touch pen 83) (Step S51). Further, the target characteristic setting module 67 judges whether the click button 83A of the touch pen 83 is pressed for dragging (Step S52). If the click button 83A is not pressed, the process returns to Step S51. If the click button 83A is pressed, the current position of the cursor 90 on the screen is stored in a memory (not shown) (Step S53).

When the current position of the cursor 90 is stored, the target characteristic setting module 67 determines which of the three regions, i.e., the lower speed characteristic operating region, the inflection point operating region and the higher speed characteristic operating region, contains the cursor 90 (Step S54). If the cursor 90 is present in the inflection point operating region, an inflection point position updating process is performed (Step S55). If the cursor 90 is present in the lower speed characteristic operating region, a lower speed characteristic curve portion updating process is performed (Step S56). If the cursor 90 is present in the higher speed characteristic operating region, a higher speed characteristic curve portion updating process is performed (Step S57).

In the inflection point position updating process (Step S55), if the cursor 90 is moved from the cursor position stored in the memory by a dragging operation with the touch pen 83 (by changing the position of the touch pen 83 on the screen with the click button 83A being pressed), the target characteristic setting module 67 detects a lateral displacement of the cursor 90 while neglecting a vertical displacement of the cursor 90. Then, the target characteristic setting module 67 updates the remote control opening degree $\theta_p$ at the inflection point 71 according to the detected displacement, and calculates a corresponding engine speed $N_p$ from the expression (5). Thus, the position of the inflection point 71 is changed.

In the lower speed characteristic curve portion updating process (Step S56), if the cursor 90 is moved from the cursor position stored in the memory by the dragging operation with the touch pen 83, the target characteristic setting module 67 detects a vertical displacement of the cursor 90 while neglecting a lateral displacement of the cursor 90. Then, the target characteristic setting module 67 updates the parameter $k_l$ according to the detected displacement. Thus, the shape of the lower speed characteristic curve portion is changed.

In the higher speed characteristic curve portion updating process (Step S57), similarly, if the cursor 90 is moved from the cursor position stored in the memory by the dragging operation with the touch pen 83, the target characteristic setting module 67 detects a vertical displacement of the cursor 90 while neglecting a lateral displacement of the cursor 90. Then, the target characteristic setting module 67 updates the parameter $k_h$ according to the detected displacement. Thus, the shape of the higher speed characteristic curve portion is changed.

After the inflection point position updating process (Step S55), the lower speed characteristic curve portion updating process (Step S56) or the higher speed characteristic curve portion updating process (Step S57), the target characteristic setting module 67 judges whether the characteristic changing button 84 is pressed (Step S58). If the characteristic changing button 84 is not pressed, a process sequence from Step S51 is repeated. Thus, the operator continues to change the target R-N characteristic table. On the other hand, if the characteristic changing button 84 is pressed, the target characteristic setting module 67 adopts the target characteristic table thus updated, and stores the target characteristic table in the target R-N characteristic table storage section 67M (Step S59). The R-T characteristic table calculating module 62 calculates the R-T characteristic table according to the updated target R-N characteristic table.

In this preferred embodiment, the operator can easily set the target engine speed characteristic with respect to the remote control opening degree by thus operating the touch panel 75 and/or the cross button 76 in an intuitive manner. Further, the target characteristic can be easily updated by performing substantially the same operation. Thus, the change in the engine speed with respect to the operation of the remote control lever 8*a* can be adapted for the operator's preference. As a result, the marine vessel 1 can be easily and properly maneuvered irrespective of the level of the skill of the operator.

A plurality of target R-N characteristics set by the target characteristic setting module 67 may be registered in the target R-N characteristic table storage section 67M. In this case, one of the registered target characteristics is selected to be read out according to the state of the marine vessel 1 or the operator's preference, and the selected target characteristic is used for maneuvering the marine vessel 1.

Figure 24:
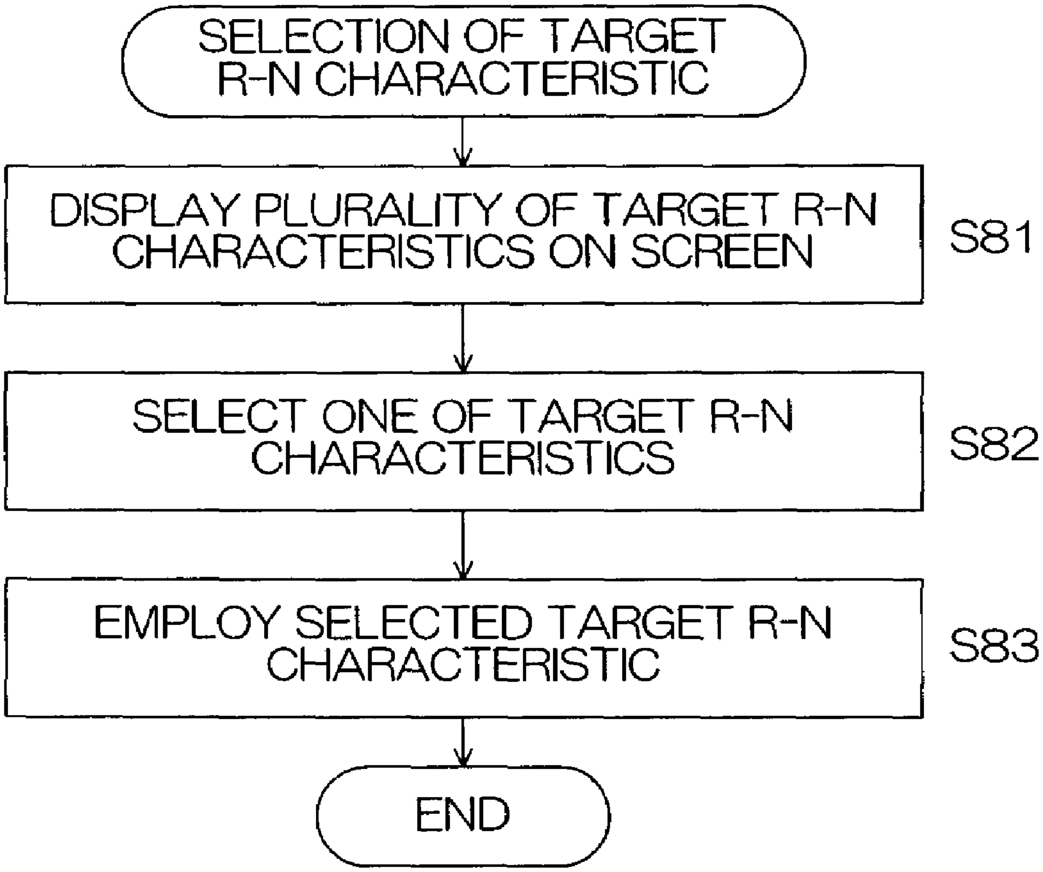
FIG. 24 is a flow chart for explaining an exemplary process for setting the target characteristic.

More specifically, as shown in FIG. 24, the target R-N characteristics stored in the target R-N characteristic table storage section 67M are read out in response to a predetermined operation performed on the input device 14, and displayed on the display device 15 by the target characteristic setting module 67 (Step S81). The operator selects one of the target R-N characteristics by operating the input device 14 (selecting unit) (Step S82). The selected target R-N characteristic is used for computation in the R-T characteristic table calculating module 62 (Step S83).

R-T characteristics previously calculated for the respective target R-N characteristics stored in the target R-N characteristic table storage section 67M are preferably stored in the R-T characteristic table storage section 62M. In this case, when one of the target R-N characteristics is selected by operating the input device 14, the R-T characteristic table calculating module 62 selects a corresponding one of the R-T characteristic tables. The target throttle opening degree calculating module 61 performs the computation based on the selected R-T characteristic table.

Figure 25:
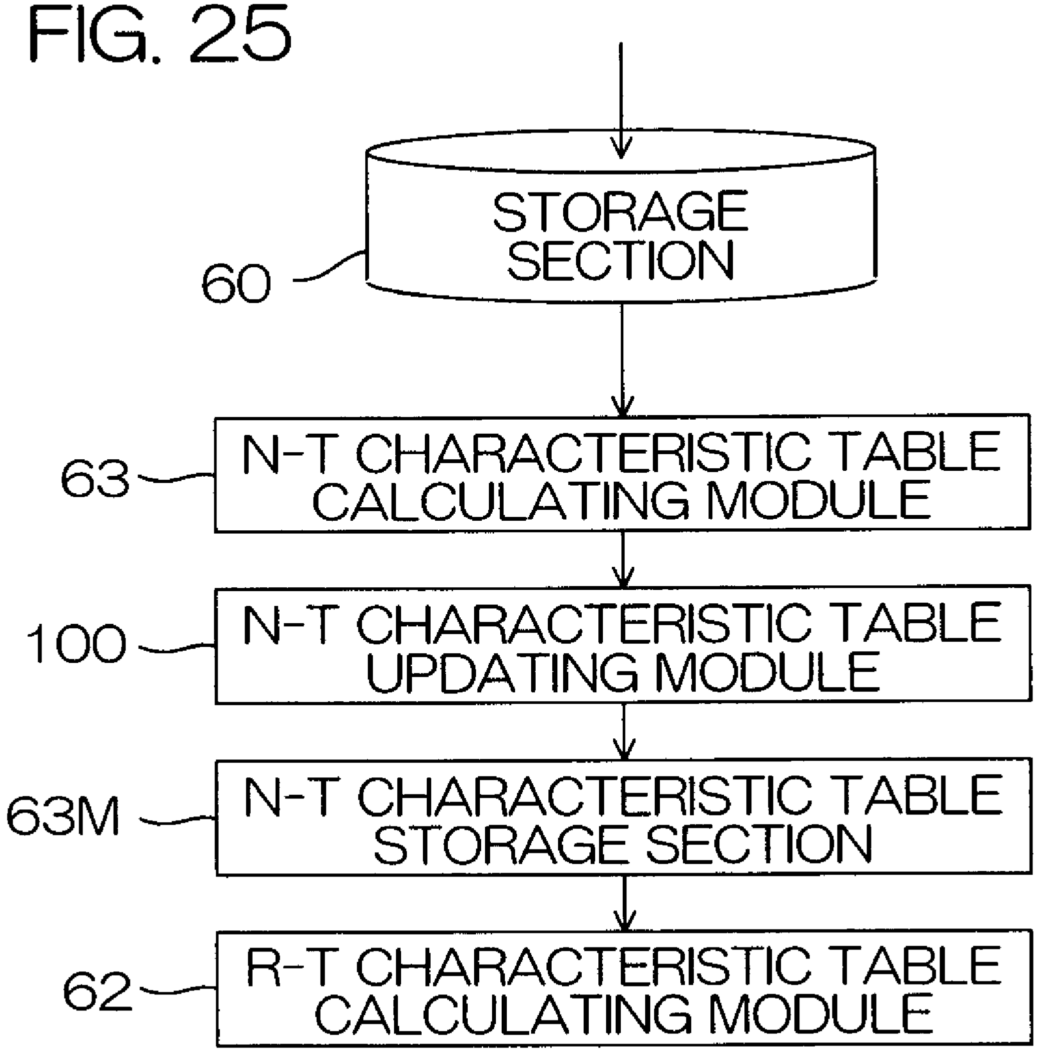
FIG. 25 is a block diagram for explaining an arrangement according to a second preferred embodiment of the present invention.

FIG. 25 is a block diagram for explaining an arrangement according to a second preferred embodiment of the present invention. When a required amount of data is accumulated in the storage section 60 by the data collecting section 64, the N-T characteristic table calculating module 63 calculates a new N-T characteristic table. In the preferred embodiment described above, the new N-T characteristic table is stored as it is in the N-T characteristic table storage section 63M, and used for the computation of the R-T characteristic table. In this preferred embodiment, on the contrary, the N-T characteristic table to be used for the computation of the R-T characteristic table is conditionally updated by an N-T characteristic table updating module 100.

Figure 26:
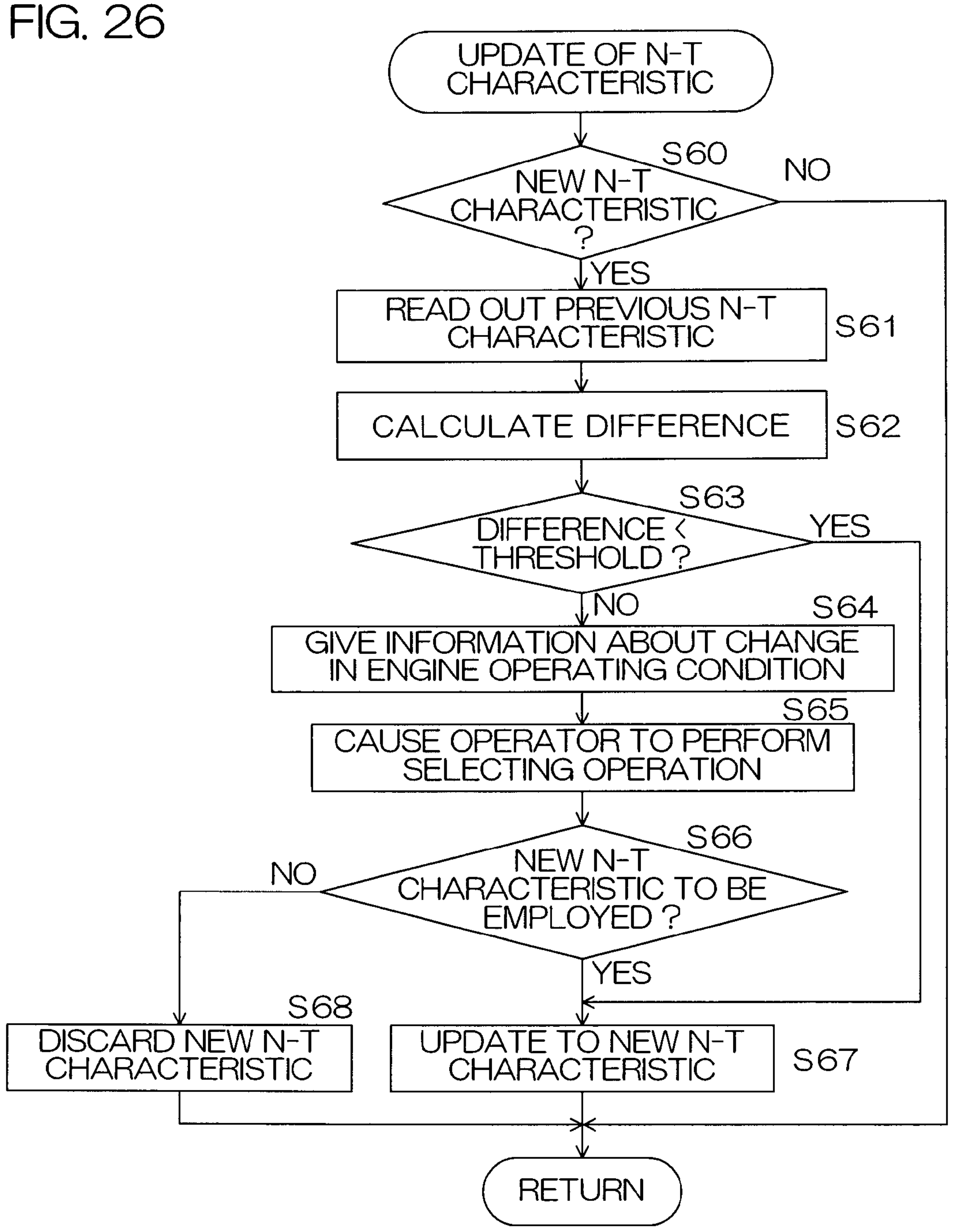
FIG. 26 is a flow chart for explaining an exemplary process for updating an N-T characteristic table.

FIG. 26 is a flow chart for explaining a process to be performed by the N-T characteristic table updating module 100. When the new N-T characteristic is calculated by the N-T characteristic table calculating module 63 (YES in Step S60), the N-T characteristic table updating module 100 reads out the previous N-T characteristic stored in the N-T characteristic table storage section 63M (Step S61). The N-T characteristic table updating module 100 further calculates a difference between the new N-T characteristic and the previous N-T characteristic, functioning as a difference calculating unit (Step S62). The calculation of the difference is achieved, for example, by calculating a distance between engine speed vectors N of the new and previous N-T characteristics. Alternatively, the calculation of the difference maybe achieved by calculating differences between corresponding components of the engine speed vectors N of the new and previous N-T characteristics, and determining the maximum one as the difference.

The N-T characteristic table updating module 100 judges whether the calculated difference is smaller than a predetermined threshold (Step S63). If the difference is smaller than the predetermined threshold, the N-T characteristic table updating module 100 unconditionally writes the new N-T characteristic in the N-T characteristic table storage section 63M (Step S67). Thus, the N-T characteristic table to be used for the calculation of the R-T characteristic table is updated to the new N-T characteristic.

On the other hand, if the calculated difference is not smaller than the threshold, the N-T characteristic table updating module 100 provides information to the operator, functioning as an informing unit (Step S64). The information may be provided, for example, by displaying a predetermined message on the display device 15. An example of the message is "The engine operating condition has been updated. Is the updated operating condition to be used?" Alternatively, an alarm or an audible message may be provided from a speaker to the operator.

In response to the information, the operator operates the input device 14 (characteristic update commanding unit) to decide whether to use the new N-T characteristic (Step S65). More specifically, for example, buttons to be selectively pressed for determining whether to update the previous N-T characteristic to the new N-T characteristic or to continue to use the previous N-T characteristic are displayed on the display device 15. The operator selects the new N-T characteristic or the previous N-T characteristic by operating one of these buttons.

If the new N-T characteristic is to be used (YES in Step S66), the N-T characteristic table updating module 100 writes the new N-T characteristic in the N-T characteristic table storage section 63M, functioning as an updating unit (Step S67). Thus, the N-T characteristic to be used for the calculation of the R-T characteristic is updated. If the previous N-T characteristic is to be used (NO in Step S64), the N-T characteristic table updating module 100 discards the new N-T characteristic (Step S68).

Where the number of the crew or the weight of the cargo is temporarily changed, for example, the marine vessel travels in a state different from an ordinary state. In this case, the engine speed characteristic with respect to the remote control opening degree is likely to be drastically changed as compared with the previous characteristic. If the N-T characteristic was automatically changed in this case, it would be difficult to control the marine vessel as desired when the traveling state is restored to an ordinary traveling state. This would cause an unnatural feeling in the operator.

In this preferred embodiment, therefore, the N-T characteristic is updated on approval by the operator, if the newly calculated N-T characteristic is significantly changed from the previous N-T characteristic.

Figure 27:
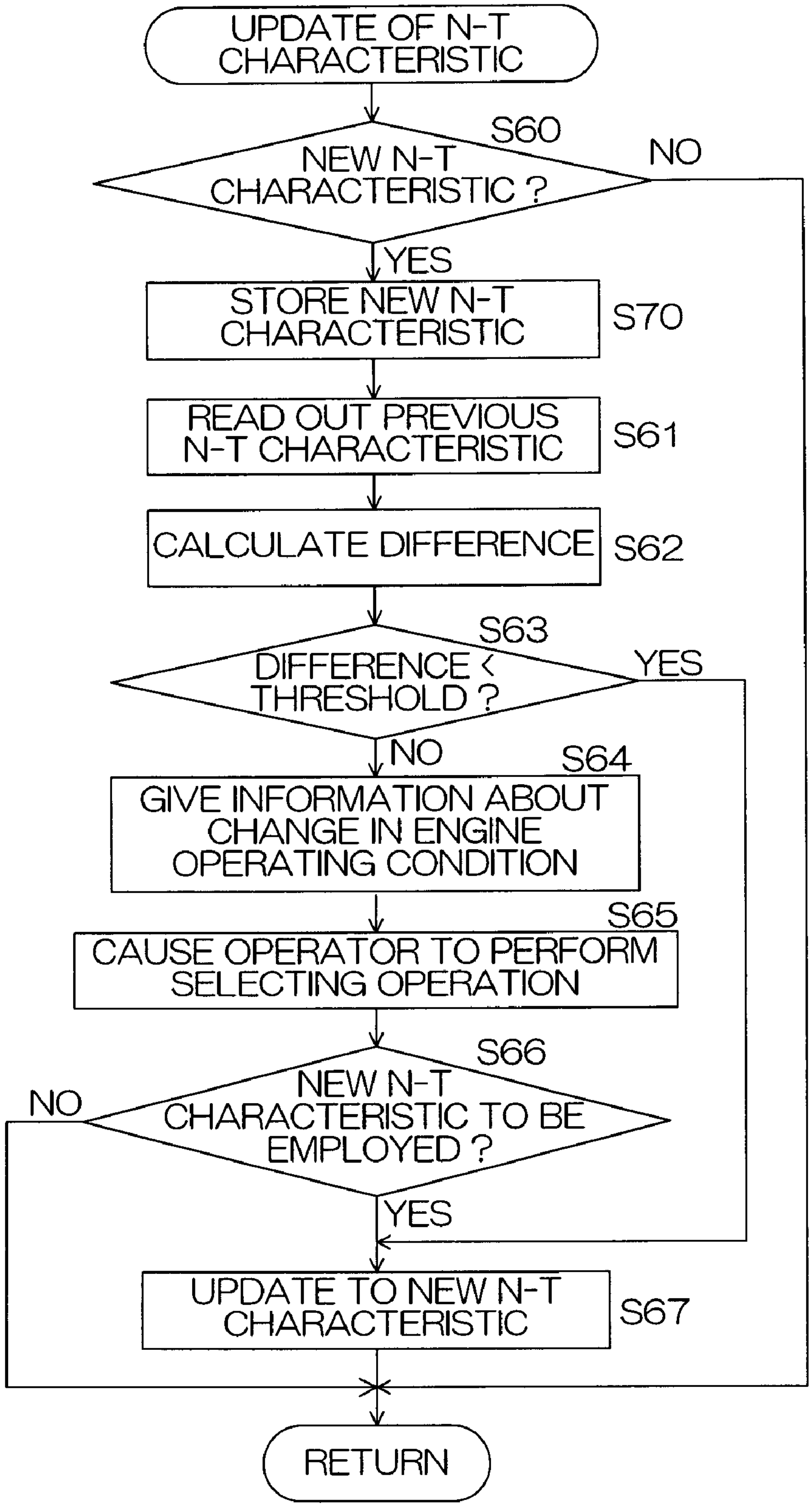
FIG. 27 is a flow chart for explaining another exemplary process for updating the N-T characteristic table.

FIG. 27 is a flow chart for explaining another exemplary process to be performed by the N-T characteristic table updating module 100. In FIG. 27, steps corresponding to those shown in FIG. 26 will be indicated by the same step numbers. This process can be used when a plurality of N-T characteristics are stored in the N-T characteristic table storage section 63M.

When the new N-T characteristic is calculated by the N-T characteristic table calculating module 63 (YES in Step S60), the N-T characteristic table updating module 100 stores the new N-T characteristic in the N-T characteristic table storage section 63M (Step S70). At this time, however, the new N-T characteristic is not necessarily used for the calculation of the R-T characteristic.

If the difference between the new N-T characteristic and the previous N-T characteristic is smaller (YES in Step S63) or if the operator decides to employ the new N-T characteristic (YES in Step S66), the new N-T characteristic is preferably used (Yes in Step S67). In this process, the N-T characteristic table updating module 100 selects and sets the new N-T characteristic from the N-T characteristics stored in the N-T characteristic table storage section 63M for the calculation of the R-T characteristic.

Even if the new N-T characteristic is not used (NO in Step S67), it is not necessary to discard the new N-T characteristic.

Figure 28:
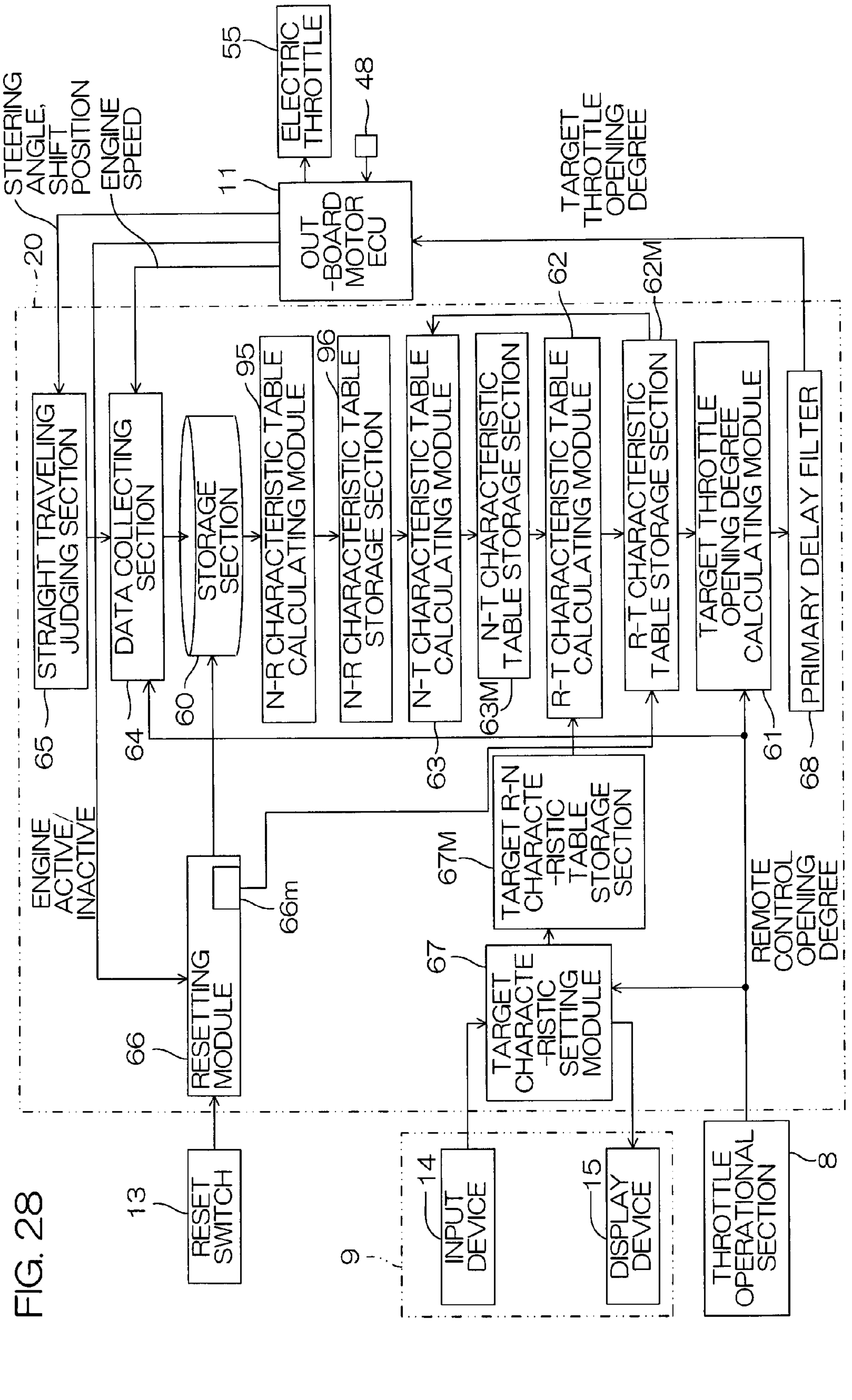
FIG. 28 is a block diagram for explaining the construction of a marine vessel running controlling apparatus according to a third preferred embodiment of the present invention.
Figure 29:
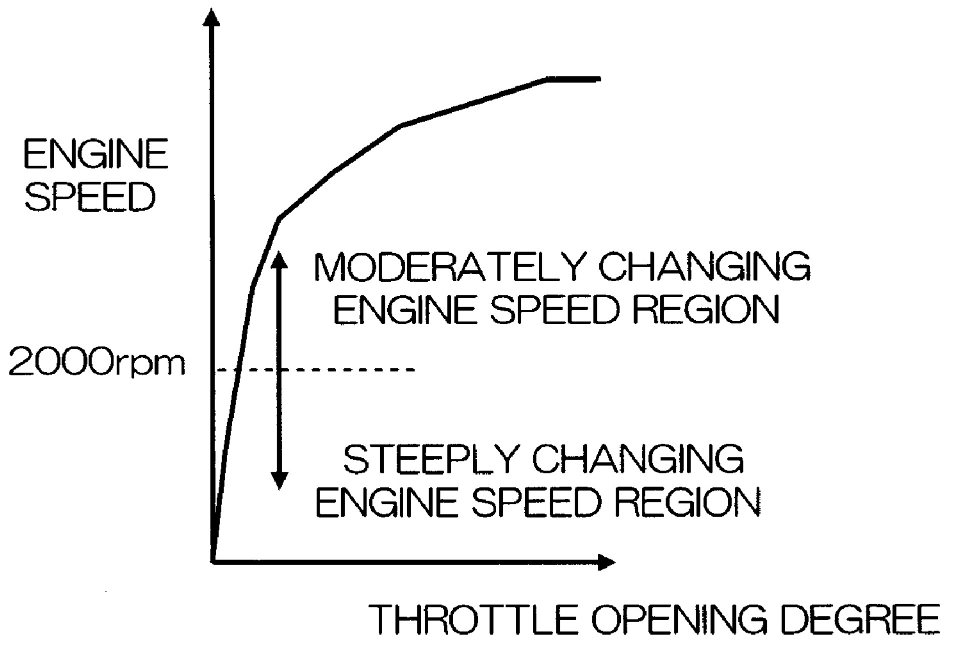
FIG. 29 PRIOR ART
FIG. 29 is a characteristic diagram for explaining a nonlinear relationship between an engine speed and a throttle opening degree.
Figure 30:
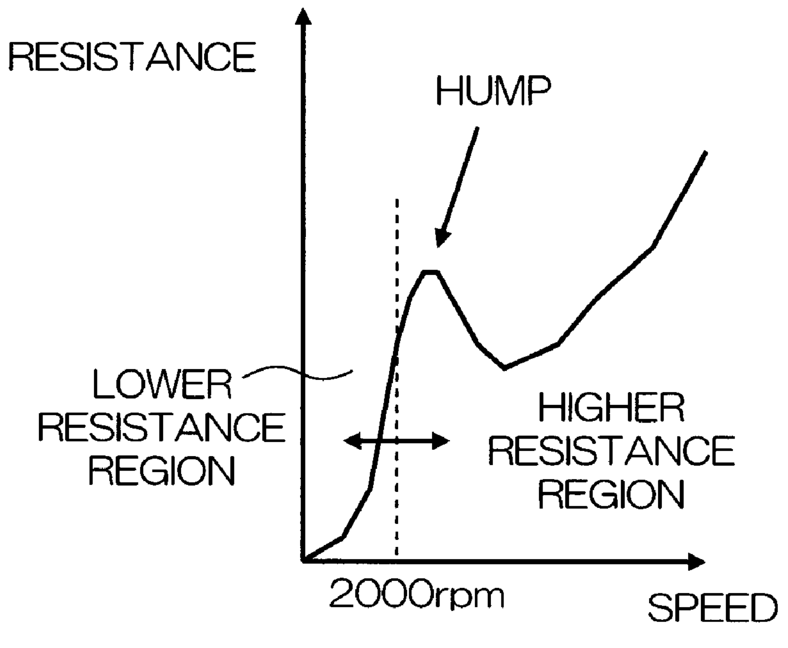
FIG. 30 PRIOR ART
FIG. 30 is a characteristic diagram for explaining a relationship between the speed of a marine vessel and a resistance received by the marine vessel.

FIG. 28 is a block diagram for explaining the construction of a marine vessel running controlling apparatus according to a third preferred embodiment of the present invention. In FIG. 28, components corresponding to those shown in FIG. 3 will be denoted by the same reference characters as in FIG. 3. In this preferred embodiment, when the straight traveling judging section 65 judges that the marine vessel is in the straight traveling state, the data collecting section 64 collects an engine speed N from the outboard motor ECU 11 and a remote control opening degree θ output from the throttle operational section 8, and stores the engine speed N and the remote control opening degree θ as learning data in the storage section 60. An N-R characteristic table calculating module 95 correlates the engine speed N and the remote control opening degree θ stored in the storage section 60 to calculate an engine speed-remote control opening degree characteristic (N-R characteristic) table. The N-R characteristic table which is based on actual measurement data of the N-R characteristic is stored in an N-R characteristic table storage section 96.

The N-T characteristic table calculating module 63 reads out the current R-T characteristic table from the R-T characteristic table storage section 62M, and calculates an N-T characteristic table based on the current R-T characteristic table and the N-R characteristic table based on the actual measurement. Then, the N-T characteristic table calculating module 63 stores the N-T characteristic table in the N-T characteristic table storage section 63M.

The other arrangements and processes are the same as those in the first preferred embodiment.

In this preferred embodiment, the engine speed N and the remote control opening degree θ are measured as the learning data, and a desired target R-N characteristic is provided based on the learning data. In this preferred embodiment, the data collecting section 64 and the N-R characteristic table calculating module 95 define an engine characteristic measuring unit.

While the preferred embodiments of the present invention have thus been described, the invention maybe embodied in other ways. In the preferred embodiments described above, the marine vessel 1 preferably includes the single outboard motor 10, but the present invention is applicable, for example, to a marine vessel including a plurality of outboard motors (e.g., two outboard motors) provided on the stern 3 thereof.

In the first and second preferred embodiments described above, the R-T characteristic table is preferably calculated if measurement values are acquired for the respective zones obtained by dividing the entire throttle opening degree range (Step S7 in FIG. 4). Alternatively, the calculation of the R-T characteristic table may be permitted if measurement values are acquired for the zone $M_1$ corresponding to the throttle fully closed state (with a throttle opening degree of 0%) and the zone $M_7$ corresponding to the throttle fully open state (with a throttle opening degree of 100%). Thus, the R-T characteristic table, which roughly conforms to the target R-N characteristic, can be quickly provided. The R-T characteristic is modified by thereafter acquiring measurement data for the other zones. Thus, the operation amount-engine speed characteristic can be converged on the target R-N characteristic with high accuracy.

Further, the third preferred embodiment may be modified in substantially the same manner as described with reference to FIGS. 24 to 27. Where the third preferred embodiment is modified in the same manner as the second preferred embodiment, the N-R characteristic instead of the N-T characteristic may be conditionally updated.

In the preferred embodiments described above, the engine speed characteristic is measured as the engine output characteristic, but the measurement of the engine output characteristic may be achieved in any other way. For example, a speed sensor for measuring the traveling speed of the marine vessel 1 may be used for indirectly measuring the engine output characteristic. More specifically, the acceleration of the marine vessel 1 based on the speed of the marine vessel 1 measured by the speed sensor may be used as the engine output characteristic.

While the present invention has been described in detail by way of the preferred embodiments thereof, it should be understood that these preferred embodiments are merely illustrative of the technical principles of the present invention but not limitative of the invention. The spirit and scope of the present invention are to be limited only by the appended claims.

This application corresponds to Japanese Patent Application No. 2005-365854 filed in the Japanese Patent Office on Dec. 20, 2005, the disclosure of which is incorporated herein by reference.

What is claimed is:

1. A marine vessel running controlling apparatus for a marine vessel which includes a propulsive force generating unit having an engine with an electric throttle as a drive source to generate a propulsive force to propel a hull of the marine vessel, the marine vessel running controlling apparatus comprising:

an operational unit to be operated by an operator of the marine vessel to control the propulsive force; and a control unit arranged to update control information related to an opening degree of the electric throttle with respect to an operation amount of the operational unit based on data obtained during travel of the marine vessel.

2. A marine vessel running controlling apparatus as set forth in claim 1, wherein the control unit includes:

an engine characteristic measuring unit arranged to measure an output characteristic of the engine;

a throttle opening degree characteristic setting unit arranged to determine an operation amount-target throttle opening degree characteristic defining a relationship between the operation amount of the operational unit and a target throttle opening degree of the electric throttle based on the engine output characteristic measured by the engine characteristic measuring unit; and a target throttle opening degree setting unit arranged to determine the target throttle opening degree for the operation amount of the operational unit according to the operation amount-target throttle opening degree characteristic determined by the throttle opening degree characteristic setting unit.

3. A marine vessel running controlling apparatus as set forth in claim 2, further comprising a target characteristic setting unit arranged to determine a target characteristic for an operation amount-engine output characteristic which defines a relationship between the operation amount of the operational unit and an engine output; wherein the throttle opening degree characteristic setting unit is arranged to determine the operation amount-target throttle opening degree characteristic so as to provide the target characteristic determined by the target characteristic setting unit.

4. A marine vessel running controlling apparatus as set forth in claim 3, further comprising a target characteristic inputting unit which receives an input to set the target characteristic for the operation amount-engine output characteristic; wherein the target characteristic setting unit is arranged to determine the target characteristic based on the input from the target characteristic inputting unit.

5. A marine vessel running controlling apparatus as set forth in claim 4, further comprising a target characteristic storage unit which is capable of storing a plurality of target characteristics for the operation amount-engine output characteristic; wherein the target characteristic inputting unit includes a selecting unit arranged to select one of the target characteristics stored in the target characteristic storage unit.

6. A marine vessel running controlling apparatus as set forth in claim 5, wherein the throttle opening degree characteristic setting unit includes a throttle opening degree characteristic storage unit which is capable of storing a plurality of operation amount-target throttle opening degree characteristics for the respective target characteristics stored in the target characteristic storage unit; and the throttle opening degree characteristic setting unit is arranged to read out one of the operation amount-target throttle opening degree characteristics corresponding to the target characteristic selected by the selecting unit from the throttle opening degree characteristic storage unit.

7. A marine vessel running controlling apparatus as set forth in claim 2, wherein the engine characteristic measuring unit includes a unit which is arranged to measure a throttle opening degree-engine output characteristic which defines a relationship between the opening degree of the electric throttle and an engine output; and the throttle opening degree characteristic setting unit is arranged to determine the operation amount-target throttle opening degree characteristic based on the throttle opening degree-engine output characteristic measured by the engine characteristic measuring unit.

8. A marine vessel running controlling apparatus as set forth in claim 2, wherein the engine characteristic measuring unit includes a unit which is arranged to measure an operation amount-engine output characteristic which defines a relationship between the operation amount of the operational unit and an engine output; and the throttle opening degree characteristic setting unit is arranged to determine the operation amount-target throttle opening degree characteristic based on the operation amount-engine output characteristic measured by the engine characteristic measuring unit.

9. A marine vessel running controlling apparatus as set forth in claim 2, further comprising:

an engine characteristic storage unit which is capable of storing the engine output characteristic measured by the engine characteristic measuring unit;

a difference computing unit arranged to compute a difference between an engine output characteristic newly measured by the engine characteristic measuring unit and the engine output characteristic previously stored in the engine characteristic storage unit; and an informing unit arranged to give information to the operator when the difference calculated by the difference computing unit is not smaller than a predetermined threshold.

10. A marine vessel running controlling apparatus as set forth in claim 9, further comprising:

a characteristic update commanding unit which is operated by the operator to select one of the newly measured engine output characteristic and the previously stored engine output characteristic to be used for computation by the throttle opening degree characteristic setting unit; and an updating unit arranged to update the previous engine output characteristic to the new engine output characteristic which is used for the computation by the throttle opening degree characteristic setting unit when the new engine output characteristic is selected via the characteristic update commanding unit.

11. A marine vessel running controlling apparatus as set forth in claim 2, further comprising a traveling judging unit arranged to judge whether the marine vessel is in a traveling state; wherein the engine characteristic measuring unit is arranged to measure the engine output characteristic if the traveling judging unit judges that the marine vessel is in the traveling state.

12. A marine vessel running controlling apparatus as set forth in claim 11, wherein the traveling judging unit includes a straight traveling judging unit arranged to judge whether the marine vessel is in a predetermined straight traveling state, and the engine characteristic measuring unit is arranged to measure the engine output characteristic if the straight traveling judging unit judges that the marine vessel is in the straight traveling state.

13. A marine vessel comprising:

a hull;

a propulsive force generating unit attached to the hull and having an engine with an electric throttle as a drive source to generate a propulsive force; and a marine vessel running controlling apparatus as recited in claim 1.

* * * * *